(12) United States Patent
Park et al.

(10) Patent No.: US 10,288,257 B2
(45) Date of Patent: May 14, 2019

(54) LIGHT-EMITTING APPARATUS

(71) Applicant: LG Innotek Co., Ltd., Seoul (KR)

(72) Inventors: Kang Yeol Park, Seoul (KR); Ki Cheol Kim, Seoul (KR); Chang Gyun Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 517 days.

(21) Appl. No.: 15/010,720

(22) Filed: Jan. 29, 2016

(65) Prior Publication Data

US 2016/0223158 A1    Aug. 4, 2016

(30) Foreign Application Priority Data

Jan. 30, 2015    (KR) .................. 10-2015-0014880

(51) Int. Cl.
| *F21K 9/64* | (2016.01) |
| *F21L 4/00* | (2006.01) |
| *F21V 7/06* | (2006.01) |
| *F21V 9/30* | (2018.01) |
| *G02B 1/11* | (2015.01) |
| *F21S 41/14* | (2018.01) |
| *F21S 41/16* | (2018.01) |
| *F21S 41/36* | (2018.01) |
| *F21V 13/14* | (2006.01) |

(Continued)

(52) U.S. Cl.
CPC .............. *F21V 7/0041* (2013.01); *F21K 9/64* (2016.08); *F21S 41/14* (2018.01); *F21S 41/16* (2018.01); *F21S 41/36* (2018.01); *F21V 7/06* (2013.01); *F21V 9/30* (2018.02); *F21V 13/14* (2013.01); *G02B 1/11* (2013.01); *G02B 19/0028* (2013.01); *F21L 4/00* (2013.01); *F21S 41/365* (2018.01); *F21Y 2115/10* (2016.08); *F21Y 2115/30* (2016.08)

(58) Field of Classification Search
CPC .......... F21V 7/0041; F21V 7/06; F21V 13/14; F21V 9/30; F21K 9/64; G02B 1/11; G02B 19/0028; F21S 41/14; F21S 41/16; F21S 41/36
See application file for complete search history.

(56) References Cited

U.S. PATENT DOCUMENTS

| 9,341,933 B2 * | 5/2016 | Jao ..................... G03B 21/2093 |
| 2009/0161338 A1 | 6/2009 | Teranishi et al. |

(Continued)

FOREIGN PATENT DOCUMENTS

| EP | 2930801 A1 | 10/2015 |
| JP | 2003295319 A | 10/2003 |

(Continued)

OTHER PUBLICATIONS

European Search Report dated Jun. 2, 2016 in European Application No. 16152351.9.

*Primary Examiner* — Thomas M Sember
(74) *Attorney, Agent, or Firm* — Saliwanchik, Lloyd & Eisenschenk

(57) ABSTRACT

Embodiments provide a light-emitting apparatus including at least one light source configured to discharge excitation light that travels straight, and a reflector configured to reflect the excitation light, which travels straight and is introduced in an incidence direction, in an emission direction, which is opposite and parallel to the incidence direction.

21 Claims, 18 Drawing Sheets

(51) Int. Cl.
*G02B 19/00* (2006.01)
*F21S 41/365* (2018.01)
*F21V 7/00* (2006.01)
*F21Y 115/30* (2016.01)
*F21Y 115/10* (2016.01)

(56) References Cited

U.S. PATENT DOCUMENTS

2010/0264820 A1   10/2010  Sumitomo et al.
2015/0159820 A1*  6/2015   Lee .................... F21V 13/08
                                                  362/84

FOREIGN PATENT DOCUMENTS

| JP | 2010232044 A | 10/2010 |
| KR | 20140039585 A | 4/2014 |
| KR | 1020140119492 A | 10/2014 |
| WO | WO-2013134802 A1 | 9/2013 |
| WO | WO-2013134804 A1 | 9/2013 |

* cited by examiner

LIGHT-EMITTING APPARATUS

CROSS REFERENCE TO RELATED APPLICATION

This application claims priority under 35 U.S.C. § 119 to Korean Patent Application No. 10-2015-014880, filed Jan. 30, 2015, which is hereby incorporated by reference in its entirety.

TECHNICAL FIELD

Embodiments relate to a light-emitting apparatus.

BACKGROUND

Light-emitting Diodes (LEDs) are semiconductor devices that convert electricity into ultraviolet light or visible light using characteristics of compound semiconductors so as to enable transmission/reception of signals, or that are used as a light source.

Group III-V nitride semiconductors are in the spotlight as core materials of light-emitting devices such as, for example, LEDs or Laser Diodes (LDs) due to physical and chemical characteristics thereof.

Such LEDs or LDs do not include environmentally harmful materials such as mercury (Hg) that are used in conventional lighting appliances such as, for example, fluorescent lamps and incandescent bulbs, and thus are very eco-friendly, and have several advantages such as, for example, long lifespan and low power consumption. As such, conventional light sources are being rapidly replaced with LEDs.

In particular, the application range of these light-emitting devices is broadening to encompass various fields including, for example, headlights for vehicles or flashlights. As such, light-emitting apparatuses that include light-emitting devices need to have excellent light extraction efficiency, and the demand for small size, light weight, and low manufacturing costs is also continuously increasing.

BRIEF SUMMARY

Embodiments provide a light-emitting apparatus having improved reliability, low manufacturing costs, a simplified configuration, and increased efficiency.

In one embodiment, a light-emitting apparatus includes at least one light source configured to discharge excitation light that travels straight, and a reflector configured to reflect the excitation light, which travels straight and is introduced in an incidence direction, in an emission direction, which is opposite and parallel to the incidence direction.

For example, the light-emitting apparatus may further include a wavelength converter configured to convert a wavelength of the excitation light, and the reflector may reflect the excitation light, which travels straight and is introduced in the incidence direction, to the wavelength converter, and may also reflect converted light, the wavelength of which has been converted by the wavelength converter, in the emission direction.

For example, the light-emitting apparatus may further include at least one optical path changing unit configured to change a direction of the excitation light, discharged from the light source, to the incidence direction.

For example, the reflector may include a parabolic surface configured to reflect the excitation light and the converted light. The parabolic surface may be subjected to metal mirror coating. The parabolic surface may have a gradient suitable for internally reflecting all of the excitation light to the wavelength converter. The gradient may be within a range from 0 to 1.5 or less. The emission direction may be a direction in which the converted light, reflected by the parabolic surface, is emitted in parallel.

For example, the light-emitting apparatus may further include a refractive member filled in a space, through which the excitation light and the converted light pass, between the reflector and the wavelength converter. The refractive member may have a boundary surface with air into which the converted light is emitted, and the boundary surface may be perpendicular to the emission direction. The refractive member may have a first index of refraction that is different from a second index of refraction of the wavelength converter. The first index of refraction may be within a range from 1.4 to 1.8. The excitation light may include blue light of a blue wavelength band, and the light-emitting apparatus may further include a blue light shielding unit located in a blue light path on a boundary surface between the refractive member and air. The blue light shielding unit may include a material that absorbs the blue light, and may include a mirror coating surface that reflects the blue light.

For example, the light-emitting apparatus may further include an anti-reflection film disposed on a boundary surface between the refractive member and air into which the converted light is emitted.

For example, the optical path changing unit may include at least one mirror configured to change the excitation light, discharged from the light source, to the incidence direction. The mirror may include a first mirror configured to reflect the excitation light, discharged from the light source in a direction parallel to the emission direction, at a right angle, and a second mirror configured to reflect the excitation light, reflected by the first mirror, in the incidence direction, at a right angle. The optical path changing unit may include a prism configured to refract the excitation light, discharged from the light source, in the incidence direction.

For example, the light source may include a plurality of light sources configured to discharge the excitation light, and the optical path changing unit may change the direction of the excitation light, discharged from the light sources, to the incidence direction. The optical path changing unit may include a plurality of optical path changing units configured to change the direction of the excitation light, discharged from the light sources, to the incidence direction respectively.

For example, the light source and the optical path changing unit may be located in a peripheral area around a lit area into which the converted light is emitted from the reflector. The optical path changing unit may be located in at least one of an inner peripheral area or an outer peripheral area included in the peripheral area and introduces the excitation light from the inner peripheral area into the reflector, the light source may be located in at least one of the inner peripheral area or the outer peripheral area, and the inner peripheral area may include an area facing the reflector, and the outer peripheral area includes an area neighboring the inner peripheral area without facing the reflector. The optical path changing unit may be located in the peripheral area at least one of above or at a side of the lit area.

For example, the light source may be located so as to direct the excitation light to the reflector toward an inner peripheral area, the inner peripheral area facing the reflector, included in a peripheral area around a lit area into which the converted light is emitted.

For example, the light-emitting apparatus may further include a light-transmitting unit located between the light source and the reflector.

For example, the excitation light that travels straight may have an angle of divergence or convergence within a range from 0° to 1°.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, exemplary embodiments will be described in detail with reference to the accompanying drawings to aid in understanding of the embodiments. However, the embodiments may be altered in various ways, and the scope of the embodiments should not be construed as limited to the following description. The embodiments are intended to provide those skilled in the art with more complete explanation.

In the following description of the embodiments, it will be understood that, when each element is referred to as being formed "on" or "under" the other element, it can be directly "on" or "under" the other element or be indirectly formed with one or more intervening elements therebetween.

In addition, it will also be understood that "on" or "under" the element may mean an upward direction and a downward direction of the element.

In addition, the relative terms "first", "second", "top/upper/above", "bottom/lower/under" and the like in the description and in the claims may be used to distinguish between any one substance or element and other substances or elements and not necessarily for describing any physical or logical relationship between the substances or elements or a particular order.

Hereinafter, light-emitting apparatuses 100A to 100K in accordance with the embodiments will be described with reference to the accompanying drawings. For convenience, although the light-emitting apparatuses 100A to 100K in accordance with the embodiments will be described using the Cartesian coordinate system (comprising the X-axis, the Y-axis, and the Z-axis), of course, it may be described using other coordinate systems. In addition, although the X-axis, the Y-axis, and the Z-axis in the Cartesian coordinate system are perpendicular to one another, the embodiments are not limited thereto. That is, in other embodiments, the X-axis, the Y-axis, and the Z-axis may cross one another, rather than being perpendicular to one another.

Figure 1A:
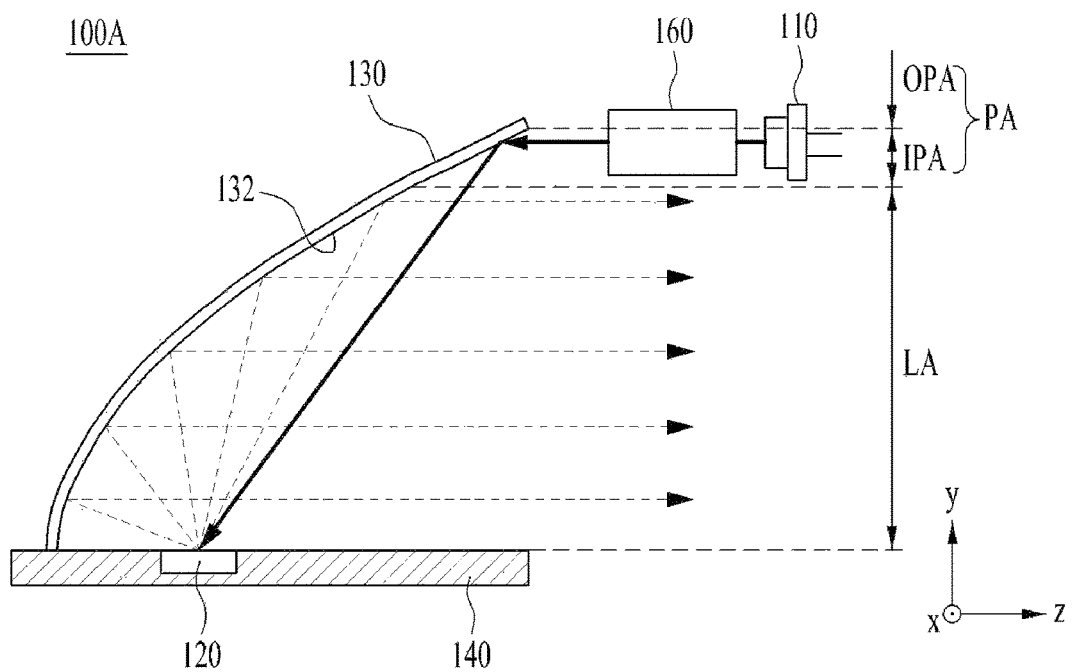
FIG. 1A is an assembled sectional view of a light-emitting apparatus in accordance with one embodiment.
Figure 1B:
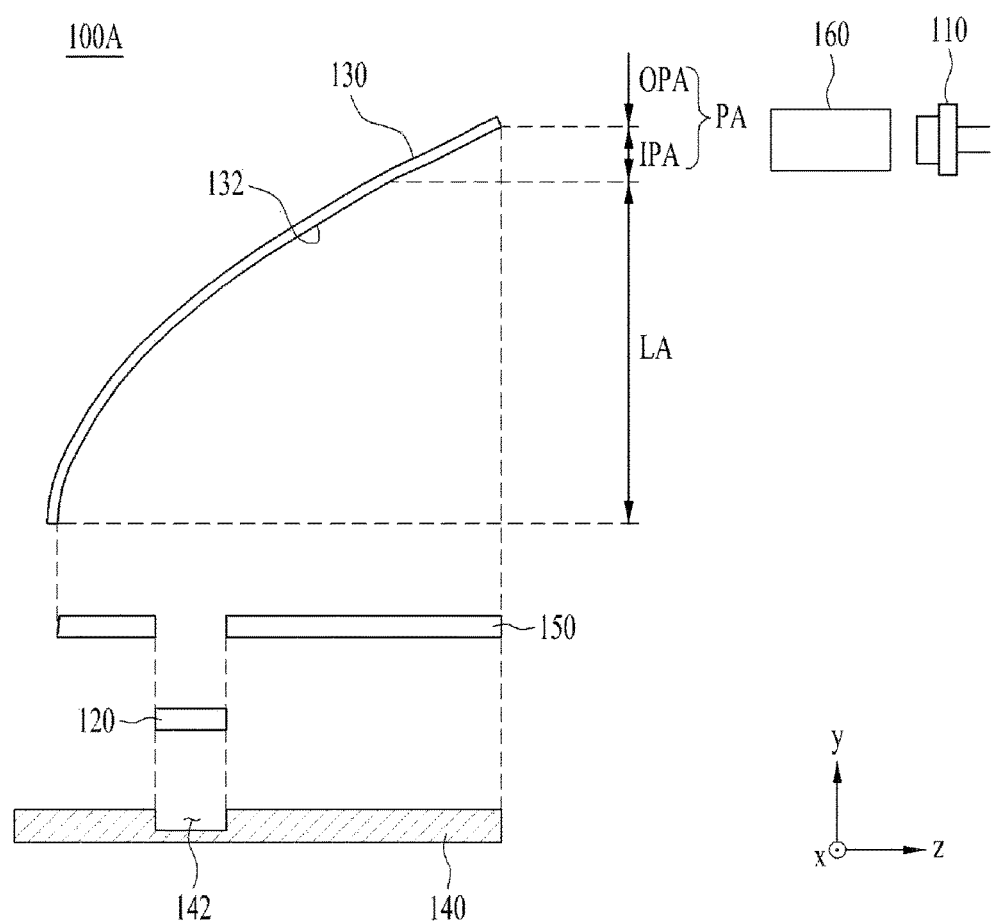
FIG. 1B is an exploded sectional view of the light-emitting apparatus illustrated in FIG. 1A.

FIG. 1A is an assembled sectional view of a light-emitting apparatus 100A in accordance with one embodiment, and FIG. 1B is an exploded sectional view of the light-emitting apparatus 100A illustrated in FIG. 1A.

Referring to FIGS. 1A and 1B, the light-emitting apparatus 100A in accordance with the embodiment may include a light source 110, a wavelength converter 120, a reflector 130, a substrate 140, a reflective layer 150, and a light-transmitting unit (or an optical unit) 160. For convenience of description, the reflective layer 150 illustrated in FIG. 1B is omitted in FIG. 1A.

The light source 110 serves to emit excitation light. Although the light source 110 may include at least one of Light-Emitting Diodes (LEDs) or Laser Diodes (LDs), the embodiment is not limited as to the kind of the light source 110.

In addition, although FIGS. 1A and 1B illustrate only one light source 110, the embodiment is not limited as to the number of light sources 110. That is, a plurality of light sources 110 may be provided as exemplarily illustrated in FIGS. 10A to 12C.

In addition, although the excitation light emitted from the light source 110 may have any peak wavelength in the wavelength band from 400 nm to 500 nm, the embodiment is not limited as to the wavelength band of the emitted excitation light. The light source 110 may emit excitation light having a Spectral Full Width at Half Maximum (SFWHM) of 10 nm or less. The SFWHM corresponds to the width of a wavelength depending on intensity. However, the embodiment is not limited to any specific value of the SFWHM. In addition, although the FWHM of excitation light, emitted from the light source 110 and introduced into the wavelength converter 120, may be 3 nm or less, the embodiment is not limited thereto.

The light-transmitting unit 160 may be located between the light source 110 and the reflector 130 and serve to focus and collimate the excitation light emitted from the light source 110.

In addition, the light-transmitting unit 160 may include a transparent medium, the index of refraction of which is 1, the same as that of air, or may include a transparent medium, the index of refraction of which is greater than 1 and equal to or less than 2. In addition, the light-transmitting unit 160 may include at least one lens having any of various shapes. In some cases, the light-emitting apparatus 100A may not include the light-transmitting unit 160.

In addition, the excitation light emitted from the light source 110 may travel straight. Alternatively, even if the excitation light emitted from the light source 110 is not straight, it may be possible to impart the excitation light with straightness using the light-transmitting unit 160. The embodiment is not limited as to the kind of the light source 110, the kind of the light-transmitting unit 160, and whether of the presence of the light-transmitting unit 160 or not so long as the excitation light emitted from the light source 110 may be directed to the reflector 130 while traveling straight. Here, that the excitation light travels straight may mean that the angle of divergence or convergence of the excitation light falls within a range from 0° to 1°. Here, the angle of divergence or convergence of the excitation light within a range from 0° to 1° may mean that the extent of diffusion of the excitation light is within a range from 0° to 0.5° on the basis of the optical axis of the light source 110.

The wavelength converter 120 serves to convert the wavelength of the excitation light, which has been emitted from the light source 110 and reflected by the reflector 130, and to emit light having the converted wavelength (hereinafter referred to as "converted light").

The wavelength converter 120 may be an assembly of numerous point light sources, and each point light source may absorb the excitation light and discharge the converted light. Since the light discharged from the wavelength converter 120 has isotropy, i.e. is not directional, all of the light from the wavelength converter 120 may be discharged from opposite surfaces of the wavelength converter 120 in almost the same amount and the same distribution. Specifically, since both the excitation light and the converted light are scattered within the wavelength converter 120 due to the scattering characteristic of the wavelength converter 120, the distribution or amount of light discharged from the front and rear of the wavelength converter 120 may differ slightly.

The illustrated wavelength converter 120 is of a reflective type, rather than a transmissive type. Therefore, the wavelength converter 120 may have high efficiency by reflecting forward all light to be discharged rearward in an amount corresponding to the reflectance of a reflective plate, with ensuring the use of all light to be discharged forward.

In addition, the wavelength converter 120 may be disposed on the substrate 140. The substrate 140 may directly face the reflector 130 as exemplarily illustrated in FIG. 1A, or may face the reflector 130 with the reflective layer 150 interposed therebetween as exemplarily illustrated in FIG. 1B. The substrate 140 may have a recess 142 in which the wavelength converter 120 is placed.

As the wavelength of the excitation light emitted from the light source 110 is converted by the wavelength converter 120, white light or light having a desired color temperature may be emitted from the light-emitting apparatus 100A. To this end, the wavelength converter 120 may include phosphors, for example, at least one of ceramic phosphors, lumiphors, or YAG single-crystals. Here, the term "lumiphors" means a luminescent material or a structure including a luminescent material.

In addition, light having a desired color temperature may be emitted from the light-emitting apparatus 100A via adjustment in, for example, the concentration, particle size, and particle-size distribution of various materials included in the wavelength converter 120, the thickness of the wavelength converter 120, the surface roughness of the wavelength converter 120, and air bubbles. For example, the wavelength converter 120 may convert the wavelength band of light having a color temperature within a range from 3000K to 9000K. That is, although the converted light, the wavelength of which has been converted by the wavelength converter 120, may be within the color temperature range from 3000K to 9000K, the embodiment is not limited thereto.

The wavelength converter 120 may be any of various types. For example, although the wavelength converter 120 may be any of three types, i.e. a Phosphor-In-Glass (PIG) type, a polycrystalline type (or ceramic type), and a single-crystalline type, the embodiment is not limited to this type.

Although not illustrated, a heat radiation plate formed of a metal material may be disposed between the wavelength converter 120 and the recess 142, so as to improve heat radiation effects.

Meanwhile, the reflector 130 serves to reflect the excitation light, which travels straight and is introduced in the incidence direction (e.g. the negative direction along the Z-axis), toward the wavelength converter 120. In addition, the reflector 130 may reflect the converted light, the wavelength of which has been converted by the wavelength converter 120, in the emission direction (e.g. the positive direction along the Z-axis), which is opposite and parallel to the incidence direction. Here, the emission direction (e.g. the positive direction along the Z-axis) may mean the direction in which all of the converted light reflected from a parabolic surface 132 of the reflector 130 is emitted in parallel. When the reflector 130 has a parabolic shape, the wavelength converter 120 may be located at a focal position of the parabolic shape. At this time, the reflector 130 may reflect both the converted light, the wavelength of which has been converted by the wavelength converter 120, and light, the wavelength of which has not been converted by the wavelength converter 120.

The reflector 130 may include the parabolic surface 132, which is suitable for reflecting the excitation light, which travels straight and is introduced in the incidence direction, and also suitable for reflecting the converted light in the emission direction, which is opposite and parallel to the incidence direction.

In one example, the parabolic surface 132 of the reflector 130 may be subjected to metal mirror coating. When the parabolic surface 132 is subjected to metal mirror coating, the excitation light may be reflected from the parabolic surface 132 to the wavelength converter 120, and the converted light may be reflected from the parabolic surface 132 so as to be emitted in the emission direction.

In some cases, the wavelength converter 120 described above may be omitted. When the light-emitting apparatus 100A does not include the wavelength converter 120, the reflector 130 may reflect the excitation light, which travels straight and is introduced in the incidence direction, to emit the excitation light in the emission direction, which is opposite and parallel to the incidence direction.

Although the case where the light-emitting apparatus 100A includes the wavelength converter 120 will be described below, of course, the following description may also be applied to the case where the light-emitting apparatus 100A does not include the wavelength converter 120.

Figure 2:
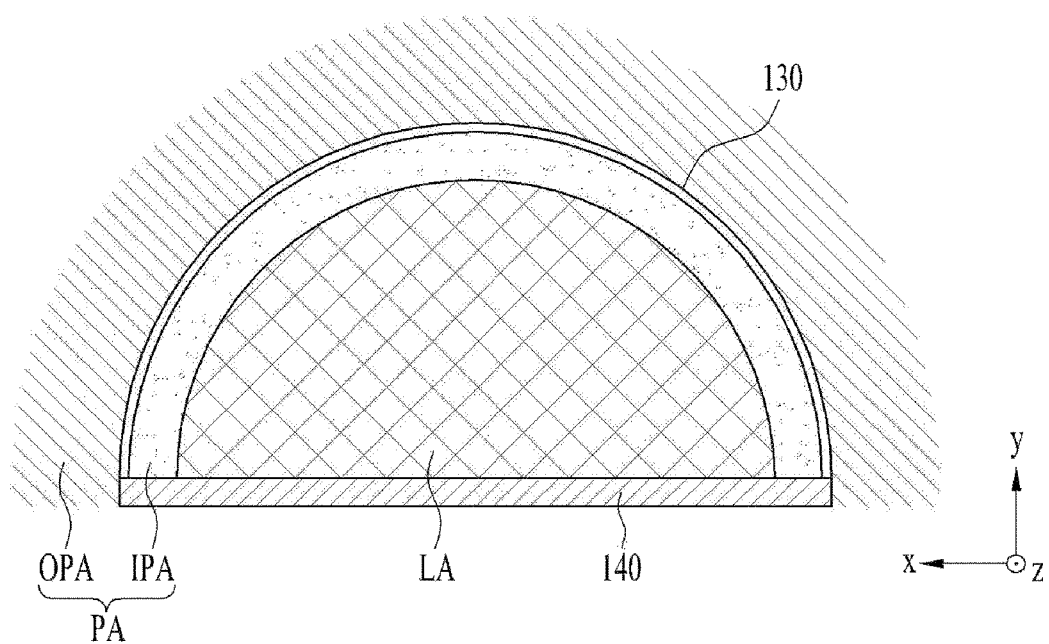
FIG. 2 is a front view of a reflector and a substrate for the explanation of a lit area and a peripheral area.

FIG. 2 is a front view of the reflector 130 and the substrate 140 for the explanation of a lit area LA and a peripheral area PA.

Referring to FIGS. 1A, 1B and 2, the lit area LA may be defined as the area in which the converted light reflected by the reflector 130 is emitted in the emission direction (e.g. the positive direction along the Z-axis). In addition, the peripheral area PA may be defined as the area around the lit area LA.

The peripheral area PA may be divided into an inner peripheral area IPA and an outer peripheral area OPA. The inner peripheral area IPA may be defined as the peripheral area that faces the inner side 132 of the reflector 130, and the outer peripheral area OPA may be defined as the peripheral area that does not face the inner side 132 of the reflector 130 and extends from the inner peripheral area IPA.

At this time, as exemplarily illustrated in FIG. 1A or 1B, although the light source 110 may be located at the position at which it may emit excitation light to the inner peripheral area IPA included in the peripheral area PA around the lit area LA, the embodiment is not limited thereto. That is, as will be described below, the excitation light may be introduced into the inner peripheral area IPA even when the light source 110 is located in the outer peripheral area OPA.

When the width (or, size) of the excitation light directed to the reflector 130 is below 5 mm, this is preferable, but is difficult to implement. When the width of the excitation light directed to the reflector 130 is 30 mm or more, the lit area LA may be narrow. In consideration of this, although the width of the excitation light may be within a range from 5 mm to 30 mm, the embodiment is not limited thereto.

In addition, the reflector 130 may include at least one selected, based on desired luminance distribution, from an aspherical surface, a freeform curved surface, a Fresnel lens, and a Holography Optical Element (HOE). Here, the freeform curved surface may be a form provided with curvilinear surfaces in various shapes.

When the Fresnel lens is used as the reflector 130, the Fresnel lens may serve as a reflector 130 that reflects light, the wavelength of which has been not converted in the wavelength converter 120, as well as the converted light, the wavelength of which has been converted.

Meanwhile, the reflective layer 150 illustrated in FIG. 1B may be attached in a film form or in a coated form to the wavelength converter 120 or the substrate 140. When the reflectance of the reflective layer 150 is below 60%, the reflective layer 150 may not properly perform reflection. Thus, although the reflectance of the reflective layer 150 may be within a range from 60% to 100%, the embodiment is not limited thereto. In some cases, the reflective layer 150 may be omitted.

Figure 3A:
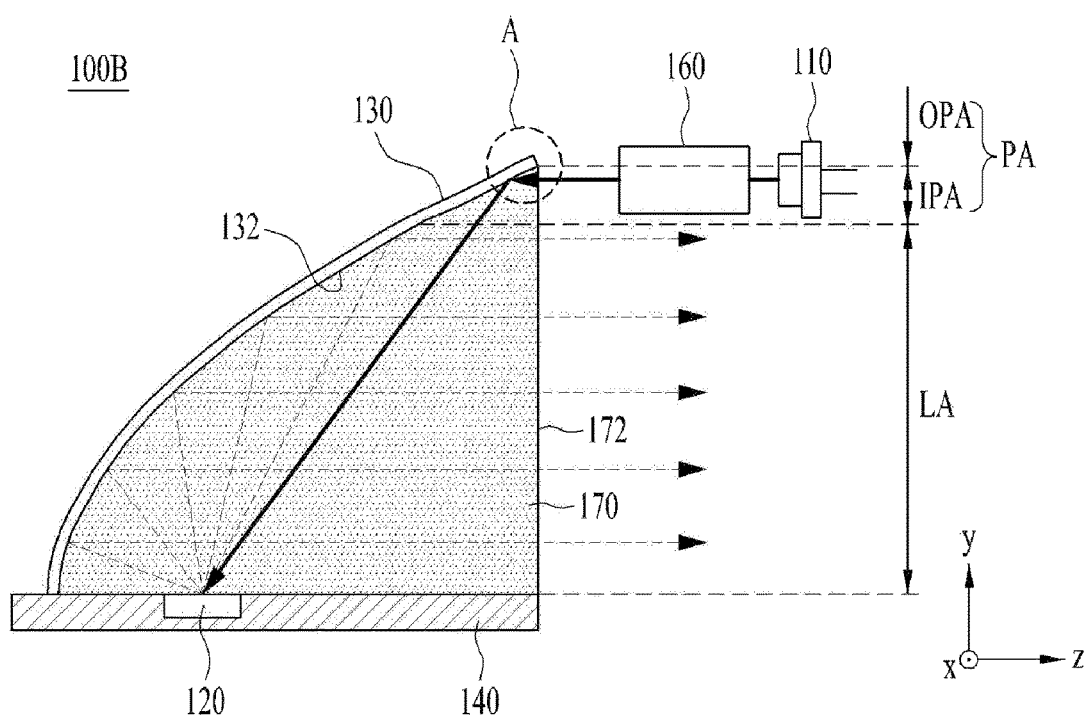
FIGS. 3A and 3B are respectively an assembled sectional view and an exploded sectional view of a light-emitting apparatus in accordance with another embodiment.
Figure 3B:
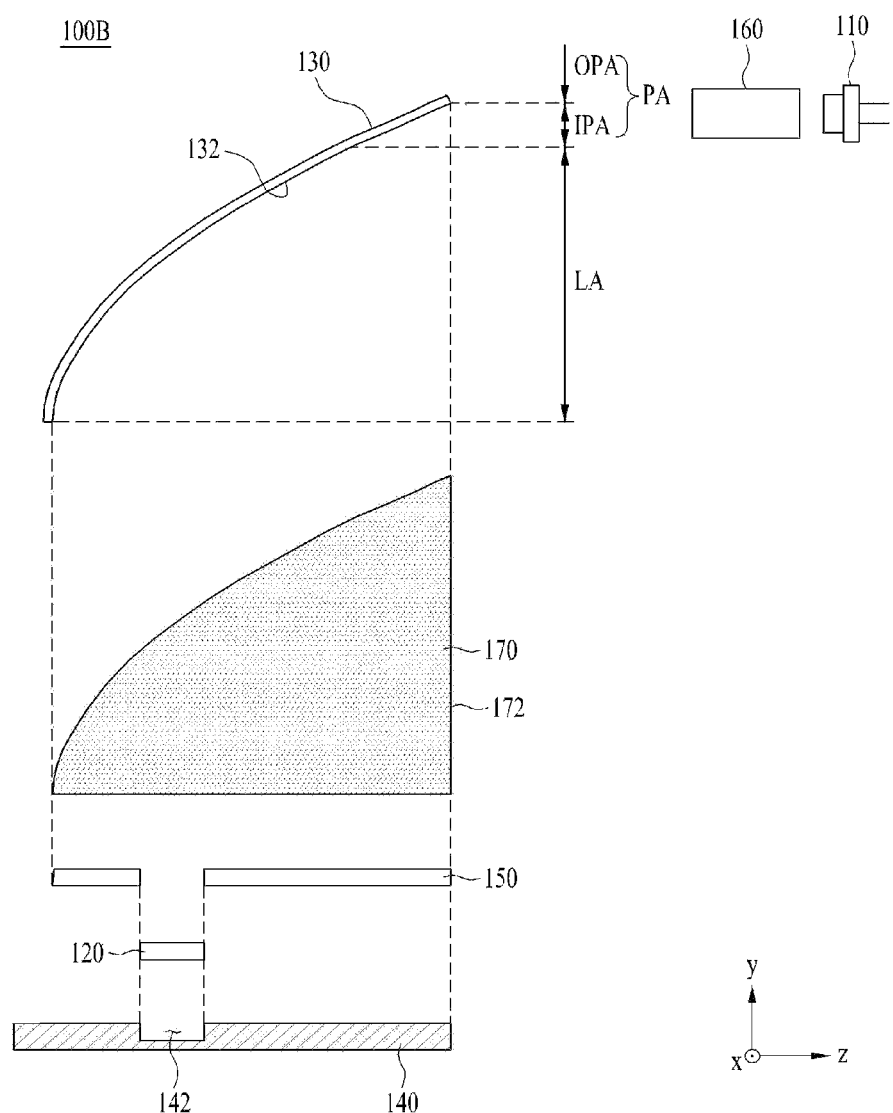

FIGS. 3A and 3B are respectively an assembled sectional view and an exploded sectional view of a light-emitting apparatus 100B in accordance with another embodiment. For convenience, the reflective layer 150 illustrated in FIG. 3B is omitted in FIG. 3A.

The light-emitting apparatus 100B illustrated in FIGS. 3A and 3B may include the light source 110, the wavelength converter 120, the reflector 130, the substrate 140, the reflective layer 150, the light-transmitting unit 160, and a refractive member 170.

Unlike the light-emitting apparatus 100A illustrated in FIGS. 1A and 1B, the light-emitting apparatus 100B illustrated in FIGS. 3A and 3B may further include the refractive member 170. Except for this difference, the light-emitting apparatus 100B illustrated in FIGS. 3A and 3B is the same as the light-emitting apparatus 100A illustrated in FIGS. 1A and 1B, and thus the same components are designated by the same reference numerals and a repeated description thereto will be omitted below.

The substrate 140 may come into direct contact with the refractive member 170 as exemplarily illustrated in FIG. 3A, or may face the refractive member 170 with the reflective layer 150 interposed therebetween as exemplarily illustrated in FIG. 3B.

Referring to FIGS. 3A and 3B, the refractive member 170 may be filled in a space, through which the excitation light and the converted light passes, between the reflector 130 and the wavelength converter 120, and may serve to refract the excitation light reflected by the reflector 130, or to refract the converted light from the wavelength converter 120.

The refractive member 170 is located to fill the entire space, through which the converted light passes toward the reflector 130 after being converted in wavelength by the wavelength converter 120, which may ensure that no air is included in the space through which the converted light passes from the wavelength converter 120. Thereby, the converted light, directed from the wavelength converter 120 to the reflector 130, may travel to the reflector 130 by way of the refractive member 170 without passing through the air, and the light reflected by the reflector 130 may be emitted to the air through a boundary surface 172 after passing through the refractive member 170. In addition, the excitation light discharged from the light source 110 is reflected by the reflector 130 after passing through the refractive member 170, and the light reflected by the reflector 130 may reach the wavelength converter 120 by way of the refractive member 170.

The boundary surface 172 between the refractive member 170 and the air, from which the converted light reflected by the parabolic surface 132 of the reflector 130 is emitted, may extend in the direction (e.g. along the Y-axis) perpendicular to the emission direction (e.g. the positive direction along the Z-axis). When the emission direction is perpendicular to the boundary surface 172, the excitation light may be introduced parallel to the parabolic surface 132, without being refracted at the boundary surface 172.

In addition, the first index of refraction n1 of the refractive member 170 may differ from the second index of refraction n2 of the wavelength converter 120. The smaller the difference Δn between the first index of refraction n1 of the refractive member 170 and the second index of refraction n2 of the wavelength converter 120 becomes, the greater the improvement of the light extraction efficiency of the light-emitting apparatus 100B becomes. However, when the difference Δn between the first and second indices of refraction n1 and n2 is large, the improvement degree of the light extraction efficiency may decrease. The constituent materials of the wavelength converter 120 and the refractive member 170 may be selected in consideration of this. For example, the refractive member 170 may include at least one of $Al_2O_3$ single crystals, $Al_2O_3$, or $SiO_2$ glass.

In addition, the second index of refraction n2 may be changed according to the type of the wavelength converter 120. When the wavelength converter 120 is a PIG type, the second index of refraction n2 may be within a range from 1.3 to 1.7. When the wavelength converter 120 is a polycrystalline type, the second index of refraction n2 may be within a range from 1.5 to 2.0. When the wavelength converter 120 is a single-crystalline type, the second index of refraction n2 may be within a range from 1.5 to 2.0. As such, although the second index of refraction n2 may be within a range from 1.3 to 2.0, the embodiment is not limited thereto.

In addition, when the refractive member 170 has high thermal conductivity, the refractive member 170 may advantageously radiate heat generated from the wavelength converter 120. The thermal conductivity may be changed based on the kind of a constituent material of the refractive member 170 and the reference temperature (i.e. the temperature of the surrounding environment). In consideration thereof, the refractive member 170 may comprise a material having thermal conductivity within a range from 1 W/mK to 50 W/mK and/or the reference temperature within a range from 20K to 400K. As described above, the material of the refractive member 170 may be determined in consideration of the fact that light extraction efficiency and heat radiation are determined based on the kind of material of the refractive member 170.

As exemplarily illustrated in FIGS. 1A and 1B, when the light-emitting apparatus 100A does not include the refractive member 170, light may inevitably be lost as described by the Fresnel equation while the light, the wavelength of which has been converted by the wavelength converter 120, travels to the reflector 130. This is because the angle for the Total Internal Reflection (TIR) of light is small due to the difference in the indices of refraction between the wavelength converter 120 and the air present between the wavelength converter 120 and the parabolic surface 132, and therefore only the converted light that is discharged at a narrow angle within the wavelength converter 120 is permitted to travel to the parabolic surface 132. Moreover, in the case where the light source 110 such as laser diodes LDs is used to emit excitation light that travels straight at much higher input power densities, the difference in the indices of refraction between the wavelength converter 120 and the air is increased further, thus leading to the loss of more light. This is because in the case where LDs are used, there is not present on material suitable for the wavelength converter 120 except a single-crystalline/poly-crystalline material having a high index of refraction.

However, as exemplarily illustrated in FIGS. 3A and 3B, when the light-emitting apparatus 100B includes the refractive member 170, the loss of light described above may be solved while the light, the wavelength of which has been converted by the wavelength converter 120, travels to the reflector 130. In consideration thereof, the refractive member 170 may be formed of a material having the index of refraction similar to that of the air. When the refractive member 170 is implemented by a material having an index of refraction similar to that of air, the converted light, the wavelength of which has been converted by the wavelength converter 120, may reach the parabolic surface 132 without loss. For example, although the first index of refraction n1 may be within a range from 1.4 to 1.8, the embodiment is not limited thereto.

In addition, the reflector 130 and the refractive member 170 may be integrally formed with each other. In this case, the refractive member 170 may serve not only as a lens, but also as a reflector. When the reflector 130 and the refractive member 170 are integrally formed with each other as described above, there may be no possibility of the converted light traveling from the wavelength converter 120 to the reflector 130 coming into contact with the air.

In addition, the refractive member 170 and the substrate 140 may have at least one pattern, selected from among a 2-dimensional pattern and a 3-dimensional pattern, according to the desired luminance distribution that is intended to be realized in the light-emitting apparatus 100B.

Meanwhile, the reflector 130 illustrated in FIGS. 3A and 3B may be subjected to metal mirror coating, in order to perform the same function as the reflector 130 illustrated in FIGS. 1A and 1B. Alternatively, the reflector 130 illustrated in FIGS. 3A and 3B may not be subjected to metal mirror coating. In this case, the parabolic surface 132 of the reflector 130 may have a gradient (or, slope) suitable for the internal reflection of all of the excitation light toward the wavelength converter 120 and the internal reflection of all of the converted light, the wavelength of which has been converted by the wavelength converter 120, in the emission direction, which is opposite and parallel to the incidence direction. Referring to FIG. 3A, all of the excitation light introduced in the incidence direction may undergo internal reflection at the portion "A" of the parabolic surface 132.

Figure 4:
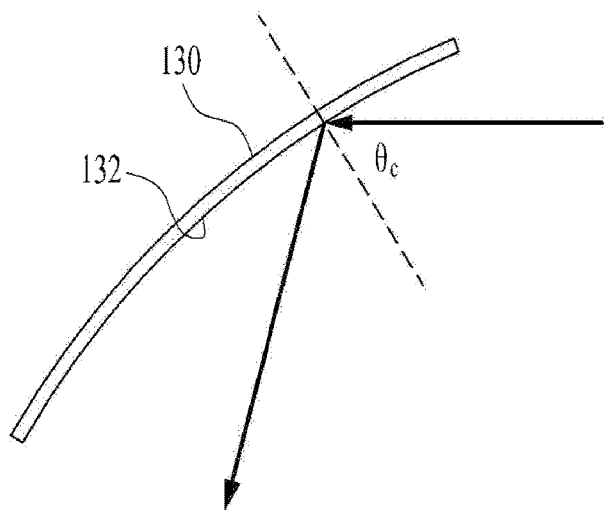
FIG. 4 is a view for the explanation of the gradient of the reflector illustrated in FIGS. 3A and 3B.

FIG. 4 is a view for the explanation of the gradient of the reflector 130 illustrated in FIGS. 3A and 3B.

Total internal reflection may occur when the excitation light or the converted light enters the reflector 130 when a gradient of the parabolic surface 132 of the reflector 130 is within a range from zero degrees to a specific value, i.e. to the maximum gradient. The maximum gradient is the gradient corresponding to the total internal reflection angle θc, and therefore may be acquired from tan(90°−θc). This will be described below in detail.

First, the gradient of the parabolic surface 132 of the reflector 130 may be known from Equation 2, in which y' is the differential value of Equation 1.

$$y^2 = 4pz \qquad \text{Equation 1}$$

$$y' = \frac{4p}{2y} = \frac{4p}{2\sqrt{4pz}} = \sqrt{\frac{p}{z}} \qquad \text{Equation 2}$$

Here, in Equation 1 and Equation 2, p is the focal distance, and z is the optical axis coordinate.

It can be appreciated from Equation 2 that total internal reflection occurs at the parabolic surface 132 when the square root of the ratio of the focal distance p to the z coordinate of the optical axis is within a range from zero to the maximum gradient. The relationship between the total internal reflection angle θc and the maximum gradient depending on the first index of refraction n1 of the refractive member 170 is as set forth in the following Table 1.

TABLE 1

| First Index of refraction | Total Internal Reflection Angle | Maximum Gradient |
| --- | --- | --- |
| 1.4 | 45.58 | 0.9798 |
| 1.5 | 41.81 | 1.1180 |
| 1.6 | 38.68 | 1.2490 |
| 1.7 | 36.03 | 1.3748 |
| 1.8 | 33.75 | 1.4967 |

As can be appreciated from Equation 2 and Table 1 described above, although the gradient of the reflector 130 for total internal reflection may be within a range from 0 to 1.5, the embodiment is not limited thereto.

Figure 5:
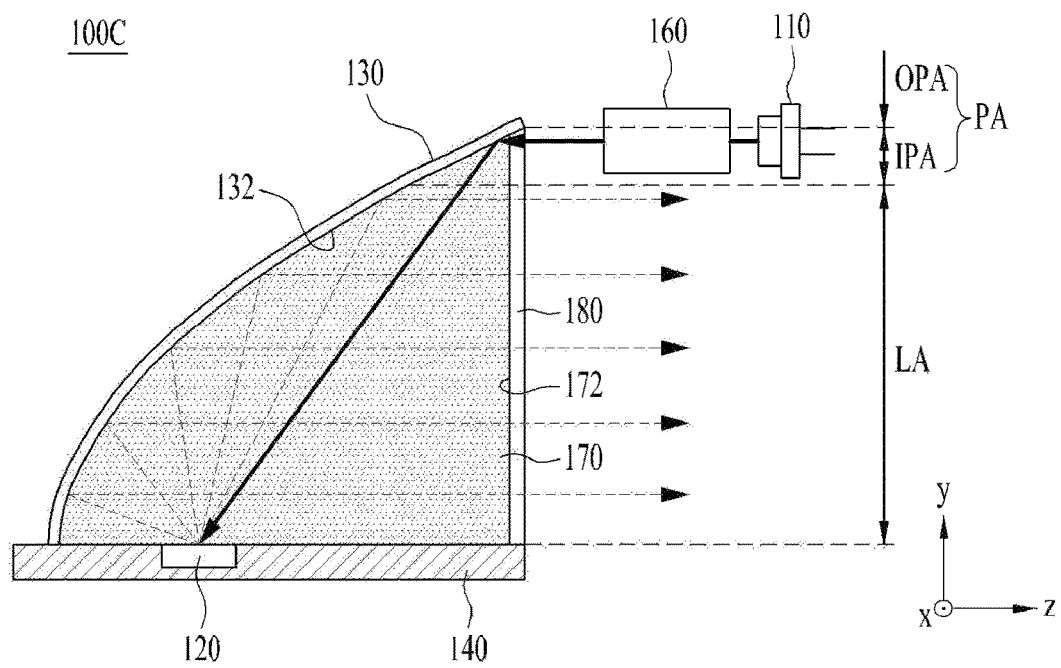
FIG. 5 is a sectional view of a light-emitting apparatus in accordance with another embodiment.

FIG. 5 is a sectional view of a light-emitting apparatus 100C in accordance with another embodiment.

The light-emitting apparatus 100C illustrated in FIG. 5 may include the light source 110, the wavelength converter 120, the reflector 130, the substrate 140, the light-transmitting unit 160, the refractive member 170, and an anti-reflection (AR) film 180.

Unlike the light-emitting apparatus 100B illustrated in FIGS. 3A and 3B, the light-emitting apparatus 100C illustrated in FIG. 5 may further include the anti-reflection film 180. Except for this difference, the light-emitting apparatus 100C illustrated in FIG. 5 is the same as the light-emitting apparatus 100B illustrated in FIG. 3A, and thus a repeated description thereto will be omitted below. That is, the light source 110, the wavelength converter 120, the reflector 130, the substrate 140, the light-transmitting unit 160, and the refractive member 170 illustrated in FIG. 5 respectively perform the same function as the light source 110, the wavelength converter 120, the reflector 130, the substrate 140, the light-transmitting unit 160, and the refractive member 170 illustrated in FIG. 3A.

The anti-reflection film 180 may be disposed between the light source 110 and the refractive member 170. The anti-reflection film 180 may be disposed on the boundary surface 172 between the refractive member 170 and the air into which the converted light is emitted. In some cases, the anti-reflection film 180 may be omitted.

Figure 6:
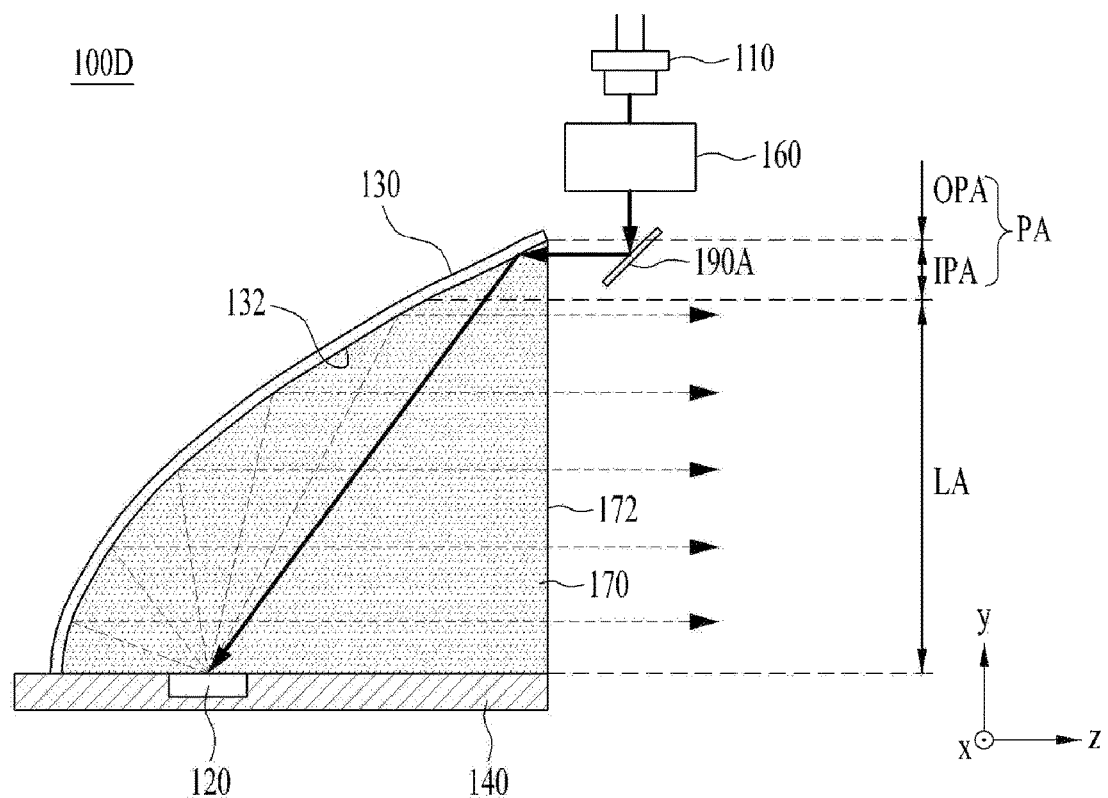
FIG. 6 is a sectional view of a light-emitting apparatus in accordance with another embodiment.

FIG. 6 is a sectional view of a light-emitting apparatus 100D in accordance with another embodiment.

The light-emitting apparatus 100D illustrated in FIG. 6 may include the light source 110, the wavelength converter 120, the reflector 130, the substrate 140, the light-transmitting unit 160, the refractive member 170, and an optical path changing unit 190A.

Unlike the light-emitting apparatus 100B illustrated in FIG. 3A, the light-emitting apparatus 100D illustrated in FIG. 6 may further include the optical path changing unit 190A. In this case, the light source 110 shown in FIG. 6 may be disposed in a position different from a position in which the light source 110 shown in FIG. 3A is disposed. Except for this difference, the light-emitting apparatus 100D illustrated in FIG. 6 is the same as the light-emitting apparatus 100B illustrated in FIG. 3A, and thus a repeated description thereto will be omitted below. That is, the light source 110, the wavelength converter 120, the reflector 130, the substrate 140, the light-transmitting unit 160, and the refractive member 170 illustrated in FIG. 6 respectively perform the same function as the light source 110, the wavelength converter 120, the reflector 130, the substrate 140, the light-transmitting unit 160, and the refractive member 170 illustrated in FIG. 3A.

The optical path changing unit 190A serves to change the direction of the excitation light, which travels straight and is discharged from the light source 110, to the incidence direction. The light source 110 and the optical path changing unit 190A may be arranged in the peripheral area PA. In particular, as exemplarily illustrated in FIG. 6, the optical path changing unit 190A may be located at a position suitable for changing the optical path of the excitation light discharged from the light source 110 so that the excitation light travels from the inner peripheral area IPA to the reflector 130. That is, in FIG. 6, the optical path changing unit 190A may be located over the inner peripheral area IPA and the outer peripheral area OPA, to change the incidence direction of the excitation light discharged from the light source 110. At this time, the light source 110 may be located in the outer peripheral area OPA.

Referring to FIG. 6, the optical path changing unit 190A may include a mirror. Here, the mirror of the optical path changing unit 190A serves to change the direction of the excitation light, discharged from the light source 110, to the incidence direction. That is, when the excitation light that travels straight is discharged from the light source 110 in the negative direction along the Y-axis, the mirror 190A serves to reflect the excitation light from the light source 110, so as to change the direction of the excitation light to the negative direction along the Y-axis to the incidence direction, which is the negative direction along the Z-axis.

Figure 7:
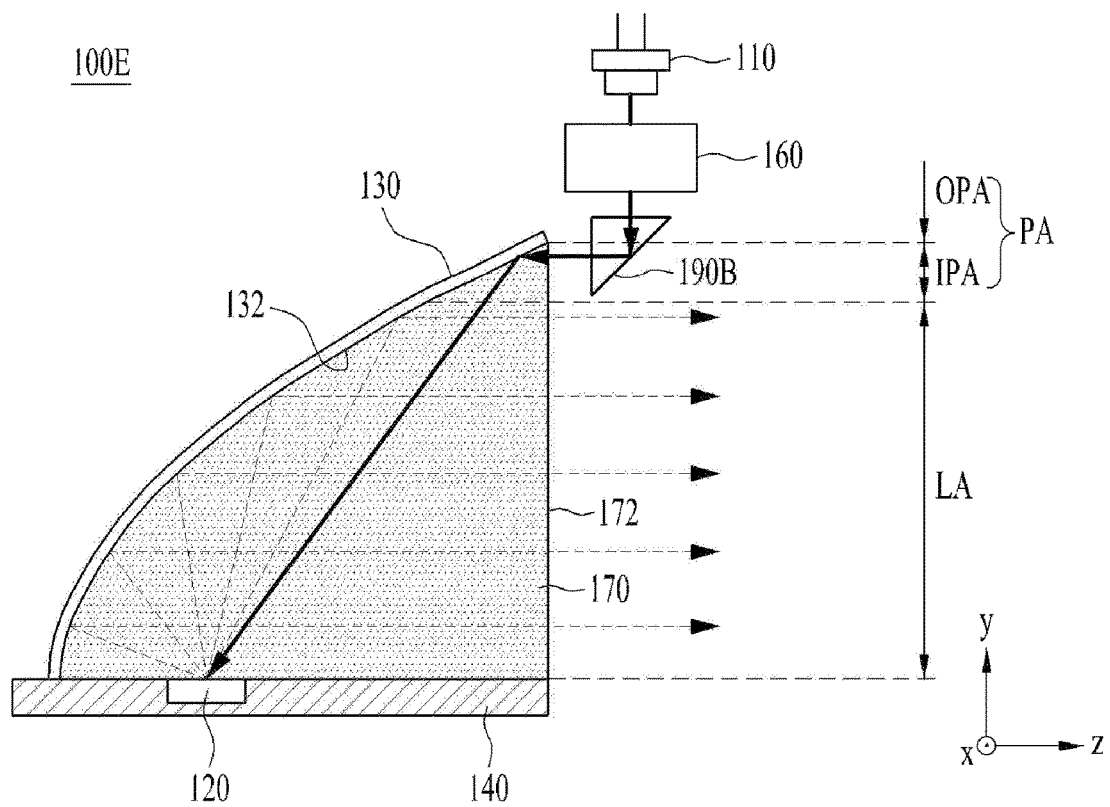
FIG. 7 is a sectional view of a light-emitting apparatus in accordance with another embodiment.

FIG. 7 is a sectional view of a light-emitting apparatus 100E in accordance with another embodiment.

The light-emitting apparatus 100E illustrated in FIG. 7 may include the light source 110, the wavelength converter 120, the reflector 130, the substrate 140, the light-transmitting unit 160, the refractive member 170, and an optical path changing unit 190B.

The light-emitting apparatus 100E illustrated in FIG. 7 may include the optical path changing unit 190B, which is different from the optical path changing unit 190A of the light-emitting apparatus 100D illustrated in FIG. 6. That is, the optical path changing unit 190B illustrated in FIG. 7 may include a prism. The prism serves to refract the excitation light, which travels straight and is discharged in the negative direction along the Y-axis from the light source 110, in the incidence direction corresponding to the negative direction along the Z-axis. In this case, the optical path changing unit 190B in the form of the prism illustrated in FIG. 7 may be located at the position suitable for changing the incidence path of the excitation light to the inner peripheral area IPA, in the same manner as the optical path changing unit 190A illustrated in FIG. 6, and the light source 110 may be located in the outer peripheral area OPA.

As described above, except the difference in the shape of the optical path changing unit 190B, the light-emitting apparatus 100E illustrated in FIG. 7 is the same as the light-emitting apparatus 100D illustrated in FIG. 6, and thus a repeated description thereto will be omitted below. That is, the light source 110, the wavelength converter 120, the reflector 130, the substrate 140, the light-transmitting unit 160, and the refractive member 170 illustrated in FIG. 7 respectively perform the same function as the light source 110, the wavelength converter 120, the reflector 130, the substrate 140, the light-transmitting unit 160, and the refractive member 170 illustrated in FIG. 6.

Figure 8:
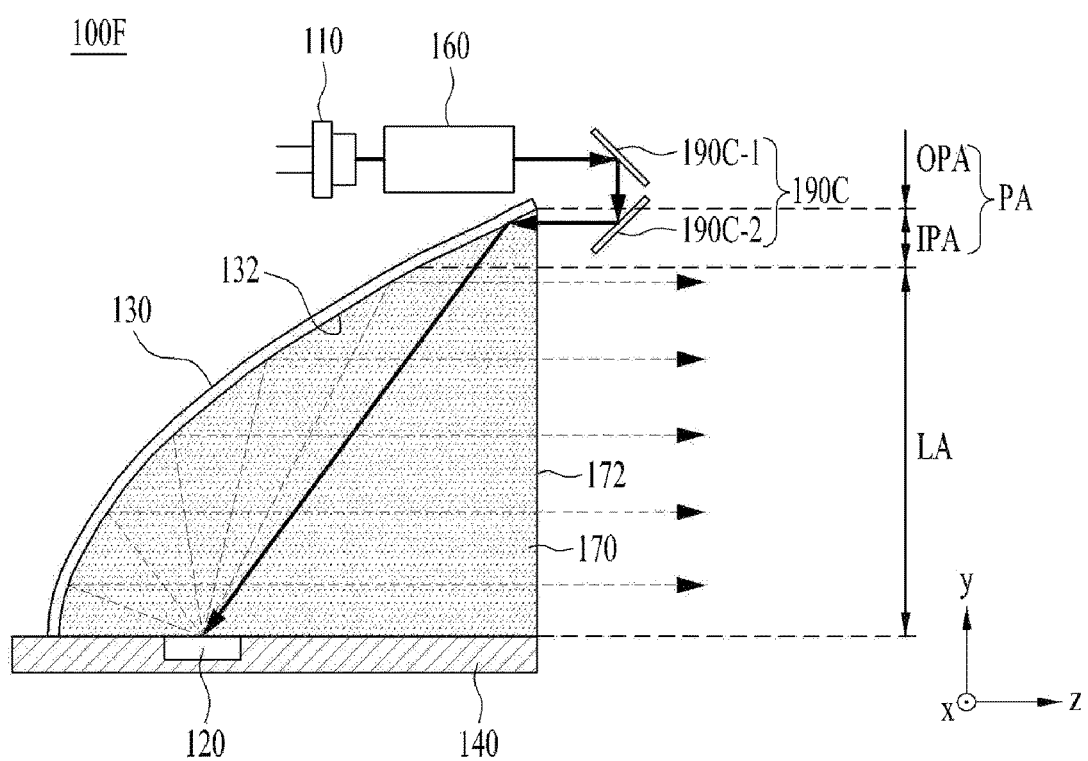
FIG. 8 is a sectional view of a light-emitting apparatus in accordance with another embodiment.

FIG. 8 is a sectional view of a light-emitting apparatus 100F in accordance with another embodiment.

The light-emitting apparatus 100F illustrated in FIG. 8 may include the light source 110, the wavelength converter 120, the reflector 130, the substrate 140, the light-transmitting unit 160, the refractive member 170, and an optical path changing unit 190C.

The light-emitting apparatus 100F illustrated in FIG. 8 may include the optical path changing unit 190C, which is different from the optical path changing unit 190A of the light-emitting apparatus 100D illustrated in FIG. 6. That is, the optical path changing unit 190A illustrated in FIG. 6 includes a single mirror, whereas the optical path changing unit 190C illustrated in FIG. 8 may include a plurality of mirrors 190C-1 and 190C-2.

In FIG. 8, the first mirror 190C-1 reflects the excitation light, discharged from the light source 110 in the direction parallel to the emission direction (e.g. the positive direction along the Z-axis), at a right angle. The excitation light, reflected by the first mirror 190C-1, travels in the negative direction along the Y-axis. In addition, the second mirror 190C-2 reflects the excitation light, reflected by the first mirror 190C-1, in the incidence direction at a right angle. That is, the excitation light reflected by the second mirror 190C-2 is directed to the incidence direction corresponding to the negative direction along the Z-axis.

In addition, the mirror, which constitutes the optical path changing unit 190A illustrated in FIG. 6, is located over the inner peripheral area IPA and the outer peripheral area OPA, whereas the second mirror 190C-2 of the optical path changing unit 190C illustrated in FIG. 8 may be located over the inner peripheral area IPA and the outer peripheral area OPA and the first mirror 190C-1 may be located only in the outer peripheral area OPA.

As described above, except the difference in the number of the mirrors and the installation locations of the mirrors, the light-emitting apparatus 100F illustrated in FIG. 8 is the same as the light-emitting apparatus 100D illustrated in FIG. 6, and thus a repeated description thereto will be omitted below. That is, the light source 110, the wavelength converter 120, the reflector 130, the substrate 140, the light-transmitting unit 160, and the refractive member 170 illustrated in FIG. 8 respectively perform the same function as the light source 110, the wavelength converter 120, the reflector 130, the substrate 140, the light-transmitting unit 160, and the refractive member 170 illustrated in FIG. 6.

Figure 9:
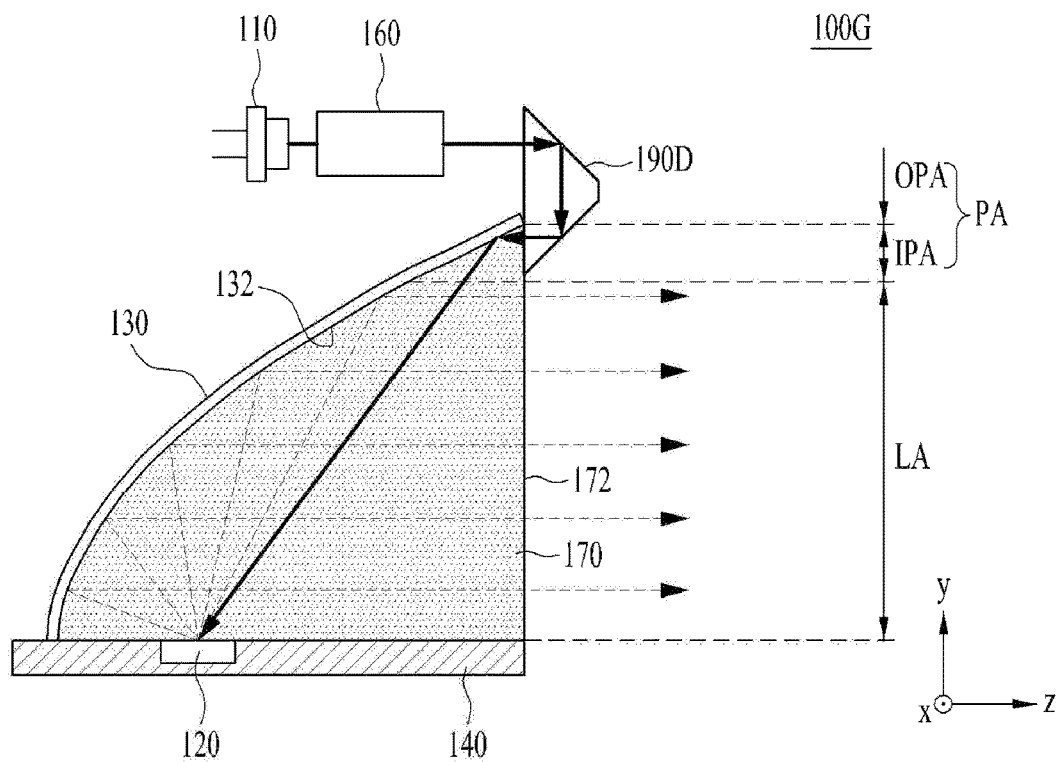
FIG. 9 is a sectional view of a light-emitting apparatus in accordance with another embodiment.

FIG. 9 is a sectional view of a light-emitting apparatus 100G in accordance with another embodiment.

The light-emitting apparatus 100G illustrated in FIG. 9 may include the light source 110, the wavelength converter 120, the reflector 130, the substrate 140, the light-transmitting unit 160, the refractive member 170, and an optical path changing unit 190D.

The light-emitting apparatus 100G illustrated in FIG. 9 may include the optical path changing unit 190D, which has a shape different from that of the optical path changing unit 190B of the light-emitting apparatus 100E illustrated in FIG. 7. That is, the optical path changing unit 190B illustrated in FIG. 7 includes a triangular prism, whereas the optical path changing unit 190D illustrated in FIG. 9 may include a trapezoidal prism.

The prism of the optical path changing unit 190D primarily reflects the excitation light, discharged from the light source 110 in the emission direction (e.g. the positive direction along the Z-axis), at a right angle, and secondarily reflects the excitation light, primarily reflected at a right angle, to the incidence direction at a right angle. That is, the excitation light, reflected by the optical path changing unit 190D, which has the form of a prism, is directed in the incidence direction, which is the negative direction along the Z-axis.

As described above, except the difference in the shape of the prism, the light-emitting apparatus 100G illustrated in FIG. 9 is the same as the light-emitting apparatus 100E illustrated in FIG. 7, and thus a repeated description thereto will be omitted below. That is, the light source 110, the wavelength converter 120, the reflector 130, the substrate 140, the light-transmitting unit 160, and the refractive member 170 illustrated in FIG. 9 respectively perform the same function as the light source 110, the wavelength converter 120, the reflector 130, the substrate 140, the light-transmitting unit 160, and the refractive member 170 illustrated in FIG. 7.

Meanwhile, when the light-emitting apparatus in accordance with the embodiment is used in, for example, a lighting apparatus for a vehicle, a plurality of light sources 110 may be provided. As such, the number of light sources 110 may be changed in various ways according to the application field of the light-emitting apparatus in accordance with the embodiment. Hereinafter, light-emitting apparatuses 100H to 100J including a plurality of light sources in accordance with the respective embodiments will be described. At this time, although the number of light sources 110 will be described below as being three, the following description may also be applied when the number of light sources 110 is less than or greater than three. In addition, although the optical path changing unit included in the light-emitting apparatuses 100H to 100J in accordance with the embodiments will be described below as being the optical path changing unit 190D illustrated in FIG. 9, the embodiments are not limited thereto. That is, the following description may also be applied when the light-emitting apparatus includes any one of the optical path changing units 190A, 190B and 190C illustrated in FIGS. 6 to 8, instead of the optical path changing unit 190D.

Figure 10A:
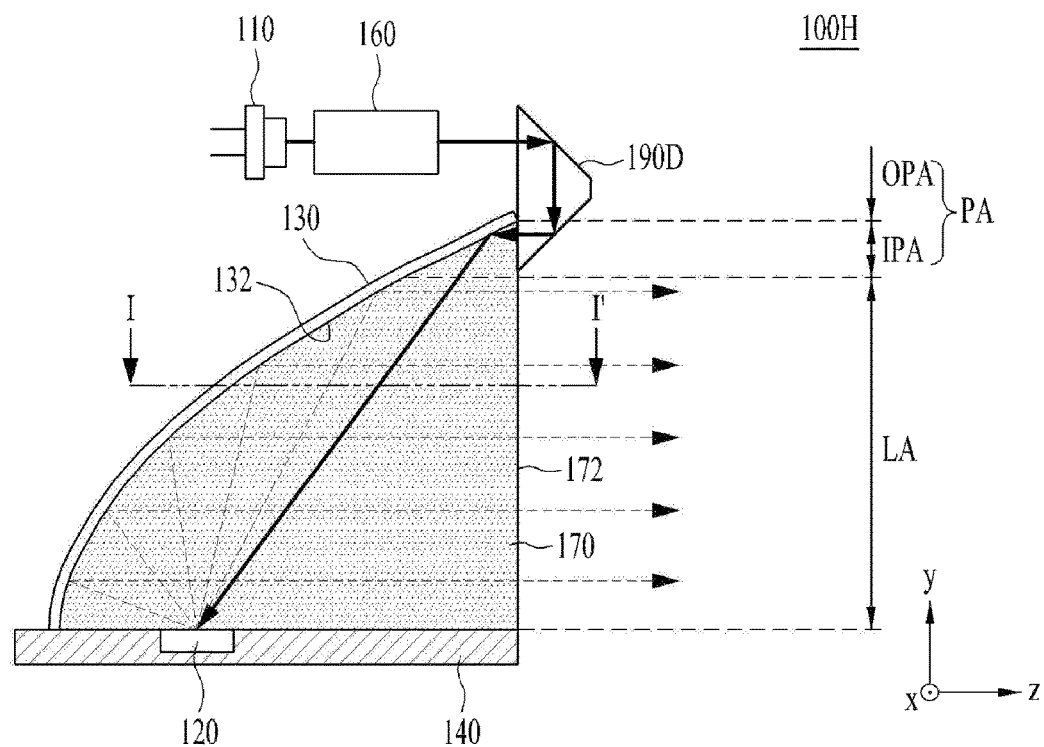
FIGS. 10A to 10C are respectively a sectional view, a plan view, and a front view of a light-emitting apparatus in accordance with another embodiment.
Figure 10B:
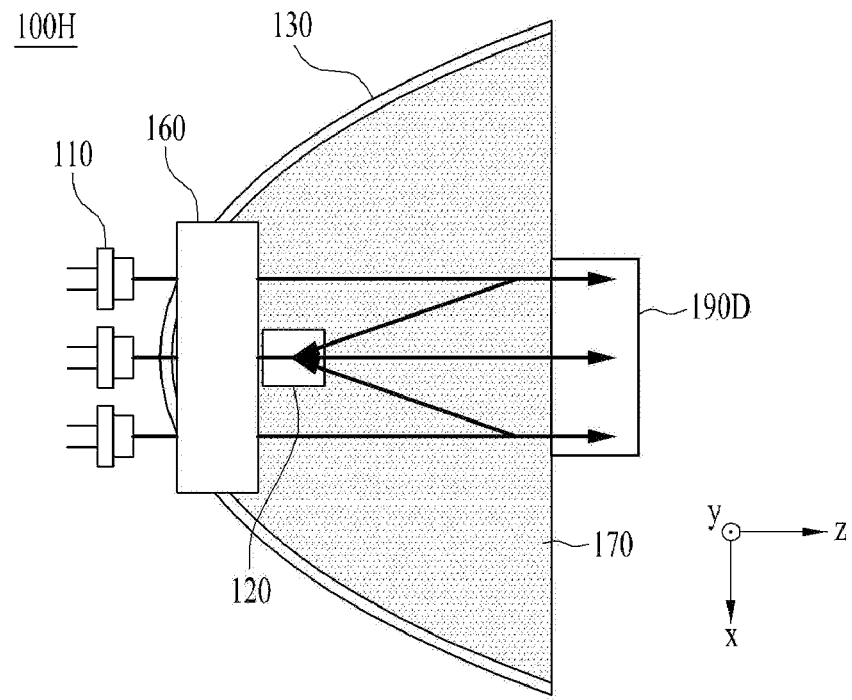
Figure 10C:
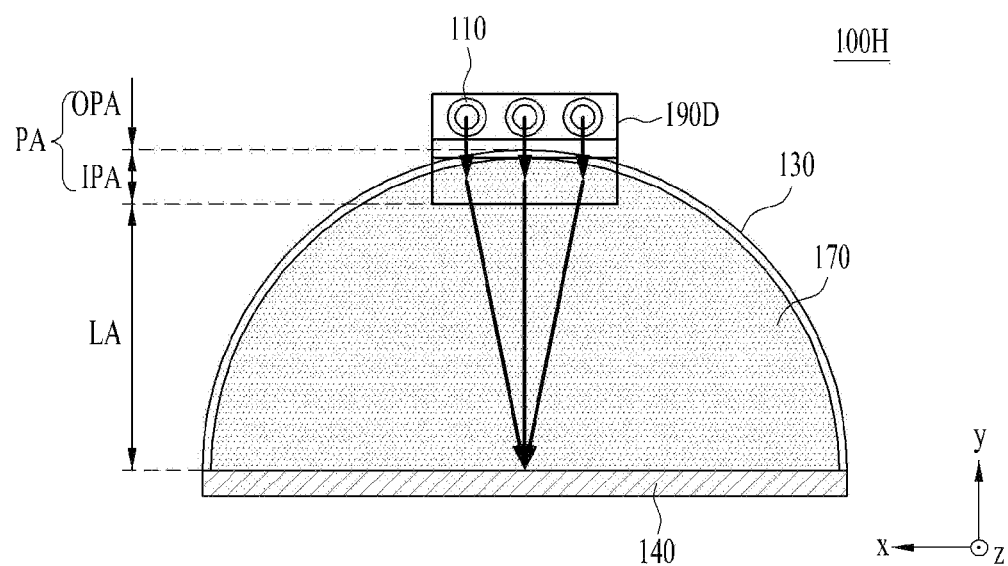

FIGS. 10A to 10C are respectively a sectional view, a plan view, and a front view of a light-emitting apparatus 100H in accordance with another embodiment. FIG. 10B is a plan view taken by cutting the reflector 130 illustrated in FIG. 10A along line I-I', in order to show the position of the wavelength converter 120 and the movement of the excitation light and the converted light.

The light-emitting apparatus 100H illustrated in FIGS. 10A to 10C may include a plurality of light sources 110, the wavelength converter 120, the reflector 130, the substrate 140, the light-transmitting unit 160, the refractive member 170, and the optical path changing unit 190D.

Referring to FIGS. 10A to 10C, the light-emitting apparatus 100H may include three light sources 110, and each light source may emit excitation light. At this time, the single optical path changing unit 190D may change the direction of excitation light discharged from the three light sources 110 to the incidence direction. That is, the three light sources 110 may share the single optical path changing unit 190D.

As described above, except the difference in the number of the light sources 110, the light-emitting apparatus 100H illustrated in FIGS. 10A to 10C is the same as the light-emitting apparatus 100G illustrated in FIG. 9, and thus a repeated description thereto will be omitted below. That is, the wavelength converter 120, the reflector 130, the substrate 140, the light-transmitting unit 160, and the refractive member 170 illustrated in FIGS. 10A to 10C respectively perform the same function as the wavelength converter 120, the reflector 130, the substrate 140, the light-transmitting unit 160, and the refractive member 170 illustrated in FIG. 9.

Figure 11A:
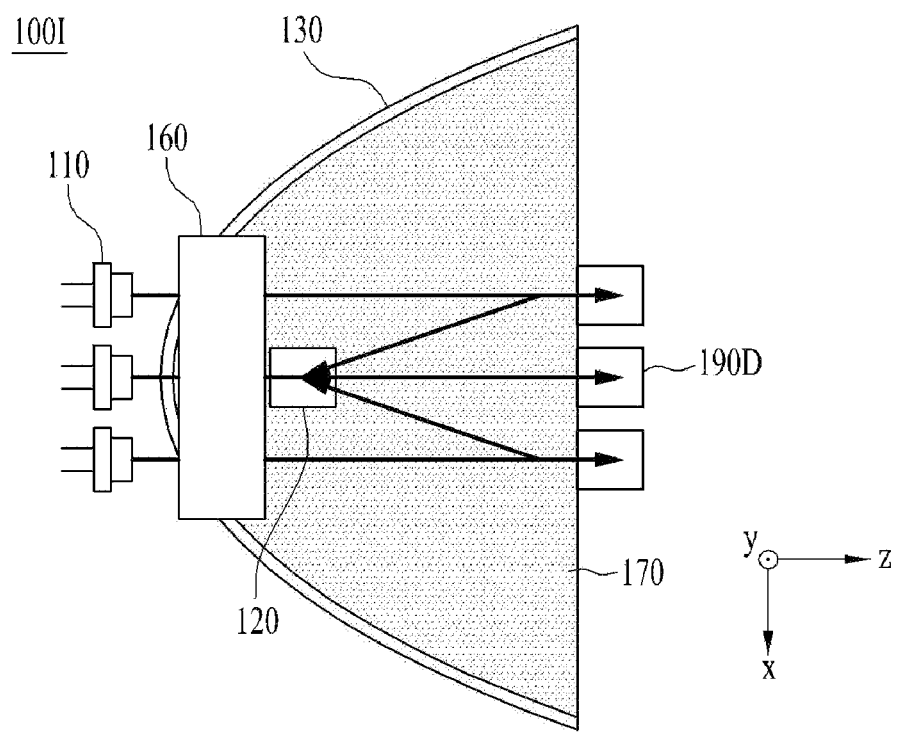
FIGS. 11A and 11B are respectively a plan view and a front view of a light-emitting apparatus in accordance with another embodiment.
Figure 11B:
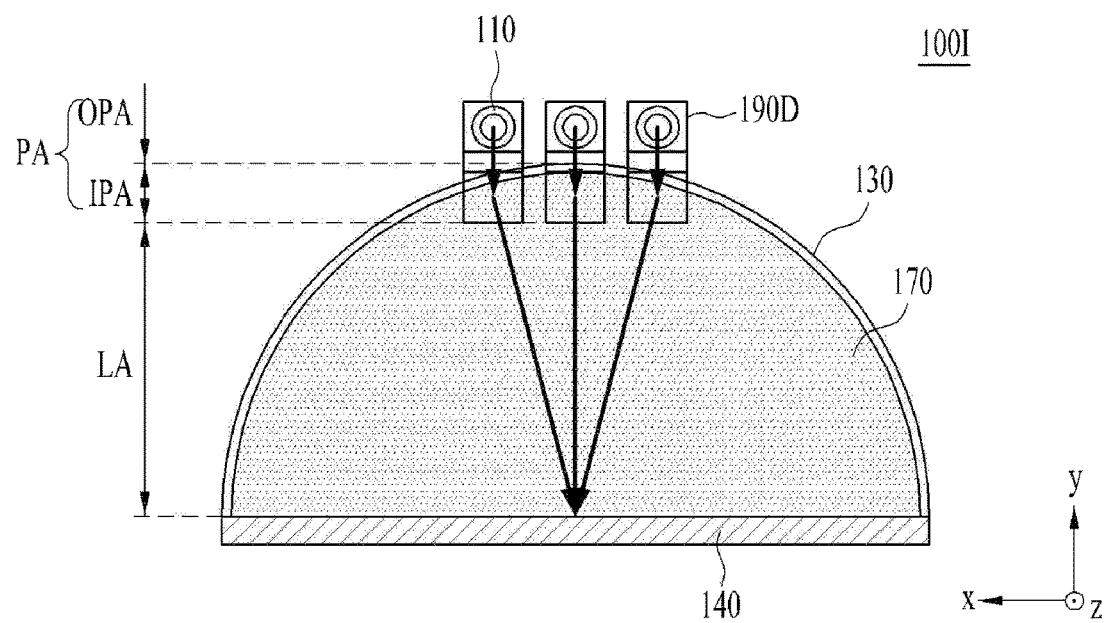

FIGS. 11A and 11B are respectively a plan view and a front view of a light-emitting apparatus 100I in accordance with another embodiment. Here, except the difference in the shape of the optical path changing unit 190D, the sectional views of FIGS. 11A and 11B are the same as the sectional view of FIG. 10A, and thus a description thereto will be omitted below.

The light-emitting apparatus 100I illustrated in FIGS. 11A and 11B may include a plurality of light sources 110, the wavelength converter 120, the reflector 130, the substrate 140, the light-transmitting unit 160, the refractive member 170, and a plurality of optical path changing units 190D.

The light-emitting apparatus 100H illustrated in FIGS. 10A to 10C have a configuration in which the light sources 110 share the single optical path changing unit 190D, whereas the light-emitting apparatus 100I illustrated in FIGS. 11A and 11B have a configuration in which the optical path changing units 190D are allotted to each light source 110 one by one.

As described above, except that the number of optical path changing units 190D is the same as the number of light sources 110, the light-emitting apparatuses 100I illustrated in FIGS. 11A and 11B are the same as the light-emitting apparatuses 100H illustrated in FIGS. 10B and 10C, respectively, and thus a repeated description to the same configuration will be omitted below.

Referring to FIGS. 11A and 11B, the three optical path changing units 190D change the direction of excitation light discharged from the three light sources 110 to the incidence direction respectively. That is, the single optical path changing unit 190D illustrated in FIGS. 10B and 10C is arranged in relation to the light sources 110 in a one-to-many ratio, whereas the optical path changing units 190D illustrated in FIGS. 11A and 11B are arranged in relation to the light sources 110 in a one-to-one ratio.

Figure 12A:
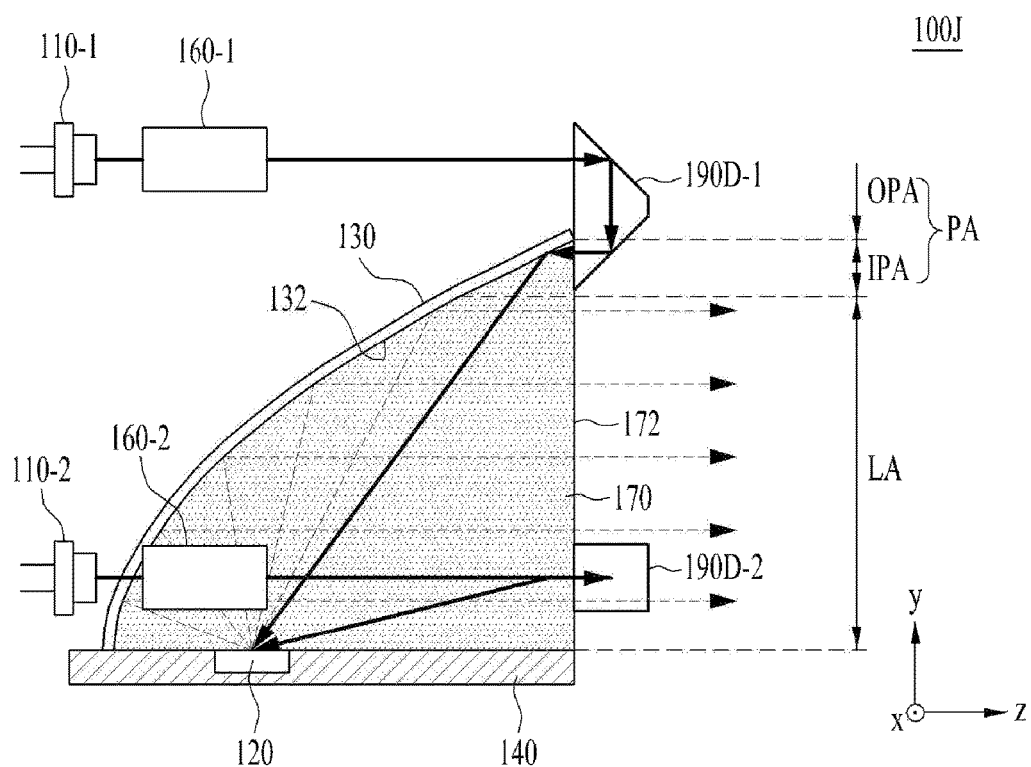
FIGS. 12A to 12C are respectively a sectional view, a plan view, and a front view of a light-emitting apparatus in accordance with another embodiment.
Figure 12B:
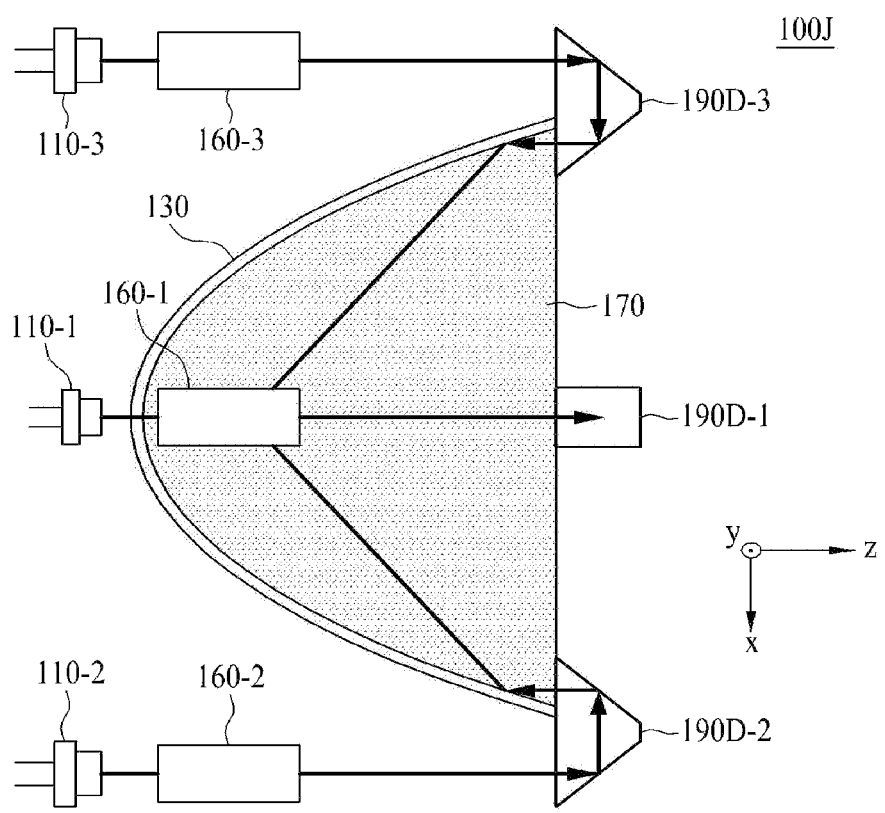
Figure 12C:
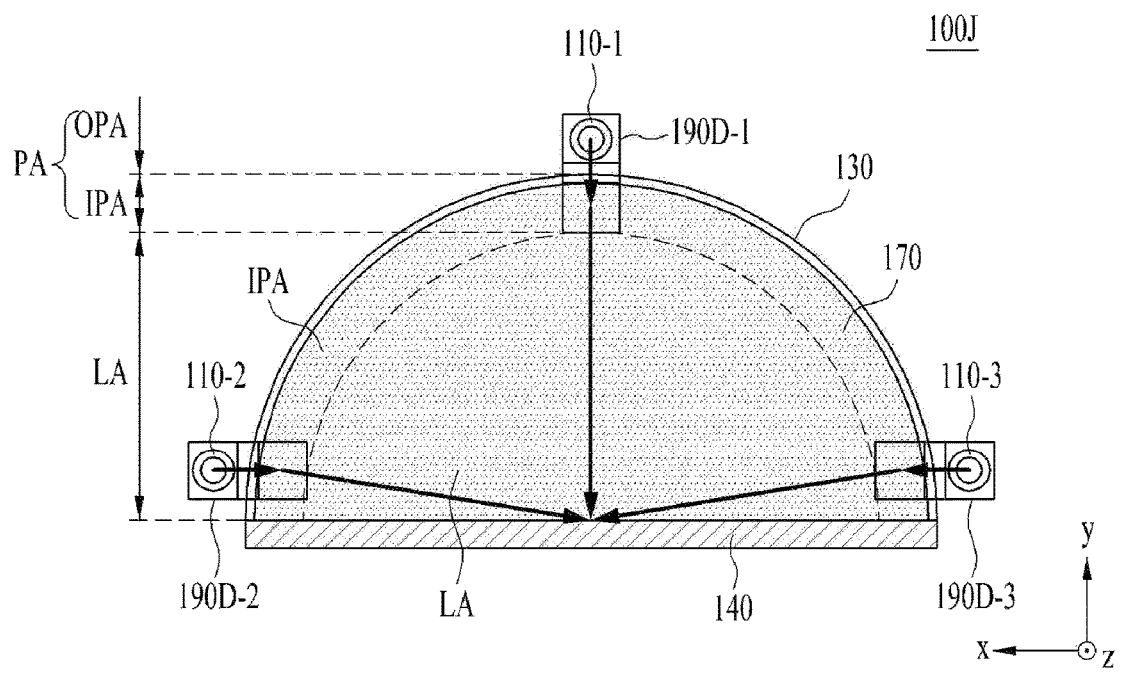

FIGS. 12A to 12C are respectively a sectional view, a plan view, and a front view of a light-emitting apparatus 100J in accordance with another embodiment.

The light-emitting apparatus 100J illustrated in FIGS. 12A to 12C may include a plurality of light sources 110-1, 110-2 and 110-3, the wavelength converter 120, the reflector 130, the substrate 140, a plurality of light-transmitting units 160-1, 160-2 and 160-3, the refractive member 170, and a plurality of optical path changing units 190D-1, 190D-2 and 190D-3.

Although the light-emitting apparatuses 100D to 100I illustrated in FIGS. 6 to 11B have a configuration in which the optical path changing units 190A to 190D are arranged in the peripheral area PA above the lit area LA, the embodiments are not limited thereto. In other embodiments, as exemplarily illustrated in FIGS. 12A to 12C, the optical path changing units 190D-1 to 190D-3 may be arranged in the peripheral area PA above the lit area LA and the peripheral area PA at opposite sides of the lit area LA.

Referring to FIG. 2 and FIGS. 12A to 12C, the first optical path changing unit 190D-1 serves to change the path of the excitation light, which travels straight and is discharged from the first light source 110-1 through the first light-transmitting unit 160-1, and is located in the peripheral area PA above the lit area LA. On the other hand, the second optical path changing unit 190D-2 serves to change the path of the excitation light, which travels straight and is discharged from the second light source 110-2 through the second light-transmitting unit 160-2, and is located in the peripheral area PA at the left side of the lit area LA. In addition, the third optical path changing unit 190D-3 serves to change the path of the excitation light, which travels straight and is discharged from the third light source 110-3 through the third light-transmitting unit 160-3, and is located in the peripheral area PA at the right side of the lit area LA. As can be seen from FIGS. 12A to 12C, the light sources 110-1 to 110-3 may be located in the outer peripheral area OPA.

As described above, except the difference in the number of the light-transmitting units 160-1, 160-2 and 160-3 and the optical path changing units 190D-1, 190D-2 and 190D-3 and the difference in the arrangement of the light sources 110-1, 110-2 and 110-3, the light-transmitting units 160-1. 160-2 and 160-3, and the optical path changing units 190D-1, 190D-2 and 190D-3, the light-emitting apparatus 100J illustrated in FIGS. 12A, 12B and 12C is the same as the light-emitting apparatus 100I illustrated in FIGS. 10A, 10B and 10C, and thus a repeated description to the same configuration will be omitted below.

Figure 13:
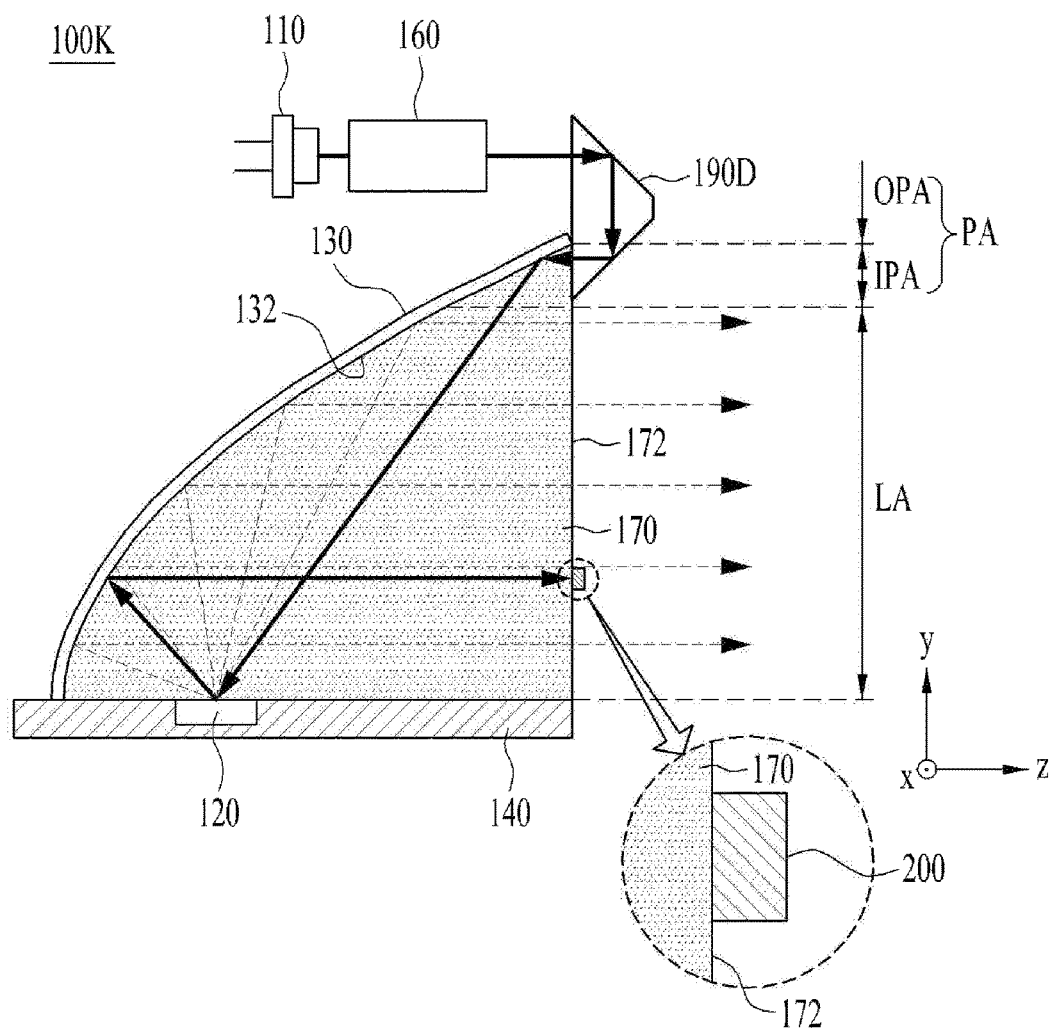
FIG. 13 is a sectional view of a light-emitting apparatus in accordance with a further embodiment.

FIG. 13 is a sectional view of a light-emitting apparatus 100K in accordance with a further embodiment.

The light-emitting apparatus 100K illustrated in FIG. 13 may include the light source 110, the wavelength converter 120, the reflector 130, the substrate 140, the light-transmitting unit 160, the refractive member 170, the optical path changing unit 190D, and a blue light shielding unit 200.

When the excitation light discharged from the light source 110 includes light within a blue wavelength band (hereinafter referred to as "blue light"), the blue light is reflected by the reflector 130 and is then introduced into the wavelength converter 120. At this time, due to the difference in the index of refraction between the wavelength converter 120 and the refractive member 170, part of the blue light may be mirror-reflected, rather than being converted in wavelength by the wavelength converter 120 according to the Fresnel equation. That is, the blue light may not be introduced into the wavelength converter 120, but may be reflected by the surface of the wavelength converter 120. At this time, the amount of mirror-reflected blue light depends on the difference in the index of refraction between the refractive member 170 and the wavelength converter 120 and the angle at which the excitation light, which is blue light, is introduced into the wavelength converter 120. When there is no difference in the index of refraction between the refractive member 170 and the wavelength converter 120, the blue light is not mirror-reflected by the wavelength converter 120. However, when there is a difference in the index of refraction between the refractive member 170 and the wavelength converter 120, the wavelength of the blue excitation light is not converted and the mirror-reflected blue light may be emitted in the emission direction through the refractive member 170. Thereby, the light-emitting apparatus may fail to emit the desired color of light.

To prevent this problem, the blue light shielding unit 200 may be located in the path of the blue light at the boundary surface 172 between the refractive member 170 and the air, so as to shield the blue light. Here, since the angle of incidence of the excitation light, which travels straight, can be known, the path of the blue light that will be mirror-reflected by the wavelength converter 120 and emitted through the boundary surface 172 may be predicted.

In one embodiment, the blue light shielding unit 200 may include a material that absorbs blue light. In another embodiment, the blue light shielding unit 200 may include a mirror coating surface that reflects blue light. As such, the blue light shielding unit 200 may prevent the blue light from being emitted through the boundary surface 172 by absorbing or reflecting the blue light.

As described above, except the addition of the blue light shielding unit 200, the light-emitting apparatus 100K illustrated in FIG. 13 is the same as the light-emitting apparatus 100H illustrated in FIG. 10A, and thus a repeated description to the same configuration will be omitted below. That is, the light source 110, the wavelength converter 120, the reflector 130, the substrate 140, the light-transmitting unit 160, and the refractive member 170 illustrated in FIG. 13 are respectively the same as the light source 110, the wavelength converter 120, the reflector 130, the substrate 140, the light-transmitting unit 160, and the refractive member 170 illustrated in FIG. 10A, and thus a repeated description thereto will be omitted below.

Although the reflective layer 150 illustrated in FIG. 1B or 3B is not illustrated in the light-emitting apparatuses 100C to 100K of FIGS. 5 to 13, the embodiments are not limited thereto. That is, in other embodiments, the light-emitting apparatuses 100C to 100K of FIGS. 5 to 13 may include the reflective layer 150 illustrated in FIG. 1B or 3B.

In addition, the light-emitting apparatuses 100D to 100K illustrated in FIGS. 6 to 13 may further include the anti-reflection film 180, which may be disposed in the form illustrated in FIG. 5.

In addition, the refractive member 170 may be omitted in the light-emitting apparatuses 100D to 100K illustrated in FIGS. 6 to 13.

Generally, when a light-emitting apparatus includes a plurality of light sources, the light-emitting apparatus necessarily adopts a complicated optical system. That is, conventional light-emitting apparatuses need one optical system to collimate a plurality of light sources and additionally need another optical system to focus excitation light discharged from respective light sources on a single point of a wavelength converter. In addition, when laser diodes are used as the light sources, the optical system needs to be complicated and elaborate because the excitation light incident to and focused on the wavelength converter must be a very small spot having a size of 100 μm. Generally, when a light-emitting apparatus is applied to a headlamp for a vehicle, the light-emitting apparatus include a plurality of light sources in order to emit a sufficient amount of light. This may increase the cost of constituent elements of the vehicle and may be very disadvantageous in terms of mass-productivity and reliability resistance to, for example, vibrations.

On the other hand, as described above, in the light-emitting apparatuses 100A to 100K in accordance with the embodiments, the direction of incidence of the excitation light that travels straight is opposite and parallel to the emission direction of converted light. The converted light, the wavelength of which has been converted by the wavelength converter 120, is reflected by the parabolic surface 132 so as to travel in parallel owing to the characteristic of the parabolic surface 132. Due to this characteristic of the parabolic surface 132, when the excitation light that travels straight is directed to the parabolic surface 132 in the parallel incidence direction, the excitation light may travel to the wavelength converter 120 after being reflected by the parabolic surface 132. At this time, the excitation light that travels straight may travel toward the wavelength converter 120 regardless of the position of the parabolic surface 132 from which it is reflected, so long as the direction of incidence of the excitation light is opposite and parallel to the emission direction regardless of the position at which the excitation light to be introduced into the parabolic surface 132 directs to the parabolic surface 132. That is, the excitation light may always enter the wavelength converter 120 regardless of whether the excitation light travels to the reflector 130 from the inner peripheral area IPA above the lit area LA as illustrated in FIGS. 1A, 1B, 3A, 3B, 5 to 11C, and 13, or whether the excitation light travels to the reflector 130 from the inner peripheral area IPA at the side of the lit area LA as illustrated in FIGS. 12A to 12C.

As described above, in the embodiment, as the excitation light travels to the reflector 130 in the incidence direction, which is opposite to and parallel to the emission direction, owing to the characteristic of the parabolic surface 132, the excitation light may be easily and efficiently focused on a single point of the wavelength converter 120. Hence, the path through which the excitation light is transmitted to the wavelength converter 120 may be simply designed, which may realize advantages in terms of cost, mass-productivity, and reliability. That is, the light-emitting apparatus of the embodiment may achieve a simplified configuration and high light conversion efficiency.

In addition, as exemplarily illustrated in FIGS. 1A and 1B, when the parabolic surface 132 is subjected to metal mirror coating and when the degree of focusing of the excitation light is high, the metal mirror coated parabolic surface 132 may be damaged. In addition, the reflectance of the metal mirror coated parabolic surface 132 is only within a range from 70% to 90%. However, as illustrated in FIGS. 3A, 3B and 5 to 13, when the light-emitting apparatuses 100B to 100K include the refractive member 170, the metal mirror coating is unnecessary because all of the light is reflected by the total internal reflection of the parabolic surface 132. Thus, the possibility of damage to the parabolic surface 132 is low even when the excitation light is focused thereon. In addition, in the case of total internal reflection, the reflectance of light reflected by the parabolic surface 132 may be maximized to 100%. In this way, when the parabolic surface 132 achieves maximized reflectance without damage, the reliability and efficiency of the light-emitting apparatus may be improved.

In addition, the light-emitting apparatuses 100A to 100K in accordance with the above-described embodiments adopt a reflection type method of reflecting the excitation light from the wavelength converter 120, rather than a transmission type method of transmitting the excitation light through the wavelength converter 120, to convert the wavelength of excitation light. When the wavelength converter 120 converts the wavelength of light by reflecting the light, light conversion efficiency may be enhanced compared to that in the transmission type method thanks to the characteristic whereby the converted light discharged in opposite directions of the wavelength converter 120 is gathered in one direction.

However, the reflection type method may generally entail a more complicated configuration and concomitant deteriorated structural stability of the light-emitting apparatus, compared to the transmission type method, because the paths of excitation light and converted light overlap each other, and therefore an optical system for excitation light needs to be formed so as not to encroach upon the path of converted light. Since lighting efficiency may be reduced when such an optical system is not used, and the size of a focal spot is increased when excitation light is introduced in a steeply oblique direction, the advantages of using laser diodes as the light source 110 may be diminished.

In consideration thereof, as illustrated in FIGS. 8, 9, 10A to 10C, 11A, 11B, 12A to 12C, and 13, when the light source 110 is located in the emission direction in which the excitation light is discharged and the optical path changing units 190C, 190D and 190D-1 to 190D-3 change the direction of the excitation light in which the excitation light travels to the incidence direction, the light-emitting apparatus may achieve a more stable configuration. Thereby, the light-emitting apparatus of the embodiment may solve the disadvantages of the reflection type method while providing high light conversion efficiency through the adoption of advantages of the reflection type method. Accordingly, compared to the related art, the light-emitting apparatus of the embodiment may exert higher performance with the same power consumption, and may provide the same performance with lower power consumption.

The light-emitting apparatuses 100A to 100K in accordance with the above-described embodiments may be applied in various fields. For example, the light-emitting apparatuses 100A to 100K may be applied to a wide range of fields including various lamps for vehicles (e.g. a low beam, a high beam, a taillight, a sidelight, a turn signal, a Day Running Light (DRL), and a fog light), as well as a flash light, a traffic light, or various other lighting appliances.

As is apparent from the above description, a light-emitting apparatus in accordance with the embodiments may be improved in terms of cost, mass-productivity, and reliability thanks to a simplified design of the path through which excitation light is transmitted to a wavelength converter using the characteristic of a parabolic surface. In addition, the light-emitting apparatus may ensure a simplified configuration and high light conversion efficiency, may achieve increased luminous efficacy by reflecting all of excitation light and wavelength-converted light using the total internal reflection, and may prevent disadvantages of a reflective type light-emitting apparatus while achieving the advantage of high light conversion efficiency of the reflective type light-emitting apparatus. In this way, the light-emitting apparatus may exert higher performance with the same power consumption, and may provide the same performance with lower power consumption, compared to the related art.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light-emitting apparatus, comprising:
   at least one light source configured to discharge excitation light that travels straight;
   a reflector configured to reflect the excitation light that travels straight and is introduced in an incidence direction;
   a wavelength converter configured to receive the excitation light reflected by the reflector, convert a wavelength of the excitation light reflected by the reflector, and emit converted light to the reflector, wherein the reflector reflects the excitation light that is introduced in the incidence direction to the wavelength converter, and also reflects the converted light that is converted by the wavelength converter in an emission direction; and
   a refractive member filled in a space, through which the excitation light and the converted light pass, between the reflector and the wavelength converter.

2. The apparatus according to claim 1, further comprising at least one optical path changing unit configured to change a direction of the excitation light, discharged from the light source, to the incidence direction.

3. The apparatus according to claim 2, wherein the optical path changing unit includes at least one mirror configured to change the excitation light, discharged from the light source, to the incidence direction.

4. The apparatus according to claim 3, wherein the mirror includes:
   a first mirror configured to reflect the excitation light, discharged from the light source in a direction parallel to the emission direction, at a right angle; and
   a second mirror configured to reflect the excitation light, reflected by the first mirror, in the incidence direction, at a right angle.

5. The apparatus according to claim 2, wherein the optical path changing unit includes a prism configured to refract the excitation light, discharged from the light source, in the incidence direction.

6. The apparatus according to claim 2, wherein the light source includes a plurality of light sources configured to discharge the excitation light, and
   wherein the optical path changing unit changes the direction of the excitation light, discharged from the light sources, to the incidence direction.

7. The apparatus according to claim 6, wherein the optical path changing unit includes a plurality of optical path changing units configured to change the direction of the excitation light, discharged from the light sources, to the incidence direction respectively.

8. The apparatus according to claim 6, wherein the light source and the optical path changing unit are located in a peripheral area around a lit area into which the converted light is emitted from the reflector.

9. The apparatus according to claim 8, wherein the optical path changing unit is located in at least one of an inner peripheral area or an outer peripheral area included in the peripheral area and introduces the excitation light from the inner peripheral area into the reflector,
   wherein the light source is located in at least one of the inner peripheral area or the outer peripheral area, and
   wherein the inner peripheral area includes an area facing the reflector, and the outer peripheral area includes an area neighboring the inner peripheral area without facing the reflector.

10. The apparatus according to claim 8, wherein the optical path changing unit is located in the peripheral area at least one of above or at a side of the lit area.

11. The apparatus according to claim 1, wherein the reflector includes a parabolic surface configured to reflect the excitation light and the converted light.

12. The apparatus according to claim 1, wherein the refractive member has a boundary surface with air into which the converted light is emitted, and the boundary surface is perpendicular to the emission direction.

13. The apparatus according to claim 1, wherein the refractive member has a first index of refraction that is different from a second index of refraction of the wavelength converter.

14. The apparatus according to claim 13, wherein the first index of refraction n1 is within a range from 1.4 to 1.8.

15. The apparatus according to claim 1, wherein the excitation light includes blue light of a blue wavelength band, and
   wherein the light-emitting apparatus further comprises a blue light shielding unit located in a blue light path on a boundary surface between the refractive member and air.

16. The apparatus according to claim 15, wherein the blue light shielding unit includes a material that absorbs the blue light, and includes a mirror coating surface that reflects the blue light.

17. The apparatus according to claim 1, further comprising an anti-reflection film disposed on a boundary surface between the refractive member and air into which the converted light is emitted.

18. The apparatus according to claim 1, wherein the light source is located so as to direct the excitation light to the reflector toward an inner peripheral area, the inner peripheral area facing the reflector, included in a peripheral area around a lit area into which the converted light is emitted.

19. The apparatus according to claim 1, further comprising a light-transmitting unit located between the light source and the reflector.

20. The apparatus according to claim 1, wherein the excitation light that travels straight has an angle of divergence or convergence within a range from 0° to 1°.

21. The apparatus according to claim 1, wherein the emission direction is opposite and parallel to the incidence direction.

* * * * *